US008383207B2

(12) United States Patent
Falbaum et al.

(10) Patent No.: US 8,383,207 B2
(45) **Date of Patent: *Feb. 26, 2013**

(54) CONFIGURABLE APPLICATION OF A TIRE DRESSING

(75) Inventors: David J. Falbaum, Minneapolis, MN (US); Darren M. Jahnke, Lonsdale, MN (US); Paul R. Kraus, Apple Valley, MN (US); Paul S. Schilling, Duluth, MN (US); Mark Lorenz, Duluth, MN (US)

(73) Assignee: ZEP IP Holding LLC, Atlanta, GA (US)

( * ) Notice: Subject to any disclaimer, the term of this patent is extended or adjusted under 35 U.S.C. 154(b) by 860 days.

This patent is subject to a terminal disclaimer.

(21) Appl. No.: 12/431,477

(22) Filed: Apr. 28, 2009

(65) Prior Publication Data

US 2010/0272916 A1 Oct. 28, 2010

(51) Int. Cl.

| | |
|---|---|
| ***B05D 1/02*** | (2006.01) |
| ***B05D 5/00*** | (2006.01) |
| ***B05D 7/00*** | (2006.01) |
| ***B28B 19/00*** | (2006.01) |
| ***B29B 15/10*** | (2006.01) |
| ***C23C 18/00*** | (2006.01) |
| ***C23C 20/00*** | (2006.01) |
| ***C23C 28/00*** | (2006.01) |

(52) U.S. Cl. ...... 427/427.2; 427/8; 427/421.1; 427/424; 118/314; 118/316; 118/713; 382/160; 382/190; 382/199

(58) Field of Classification Search ........................ None
See application file for complete search history.

(56) References Cited

U.S. PATENT DOCUMENTS

| | | | |
|---|---|---|---|
| 3,775,854 | A | 12/1973 | Hofelt, Jr. et al. |
| 4,971,084 | A | 11/1990 | Smith et al. |
| 5,054,918 | A | 10/1991 | Downing et al. |

(Continued)

FOREIGN PATENT DOCUMENTS

| | | | |
|---|---|---|---|
| EP | 294530 | A1 * | 12/1988 |
| EP | 1043578 | B1 | 10/2004 |

(Continued)

OTHER PUBLICATIONS

Bytewise Measurement Systems, Automatic Tire Identification and DOT Code Recognition using Very-High-Speed Laser Profile Sensors, available at http://www.bytewise.com/files/DOT_Code_Recognition_IntroV4.pdf as of May 14, 2006.*

(Continued)

*Primary Examiner* — Timothy Meeks
*Assistant Examiner* — Michael P Rodriguez
(74) *Attorney, Agent, or Firm* — Hunton & Williams LLP

(57) ABSTRACT

A tire dressing system includes an imaging device that captures an image of a vehicle tire or portion thereof and at least one application device that applies tire dressing to the tire based on the captured image. The system determines one or more tire parameters based on the captured image. The tire dressing system configures the at least one application device based on the tire parameter(s) such that the application device substantially restricts application of tire dressing to within the boundaries of the tire sidewalls. By determining the tire parameters, the tire dressing system may apply the tire dressing to the tire sidewalls while reducing or minimizing application of tire dressing to the body or rims of the vehicle.

15 Claims, 13 Drawing Sheets

U.S. PATENT DOCUMENTS 5,497,797 A 3/1996 Meyer, III
5,948,035 A 9/1999 Tomita
6,047,082 A 4/2000 Rhody et al.
6,270,586 B1 8/2001 Soble
6,383,295 B1 5/2002 Frederick, Jr. et al.
6,425,407 B2 7/2002 Jones et al.
6,539,789 B1 4/2003 Kostka et al.
6,551,415 B2 4/2003 Jones et al.
6,862,544 B1 3/2005 Merrill
7,230,694 B2 6/2007 Forster et al.
7,285,169 B2 * 10/2007 Mattia et al. .................. 118/264
7,295,297 B2 11/2007 Burns et al.
7,295,948 B2 * 11/2007 Jetter ............................ 702/155
7,369,956 B2 5/2008 Reynolds et al.
7,444,752 B2 11/2008 Stieff et al.
7,456,973 B2 11/2008 Steinbichler et al.
7,582,164 B1 * 9/2009 Krause et al. ................. 118/323
7,679,757 B1 * 3/2010 Harris et al. .................. 356/602
2005/0229808 A1 * 10/2005 MacDowell ............... 105/157.1
2006/0275550 A1 * 12/2006 DeBoer et al. ................ 427/371
2007/0068554 A1 * 3/2007 Essenburg ...................... 134/18
2007/0127808 A1 * 6/2007 Daniel .......................... 382/152
2007/0204684 A1 9/2007 Muhlhoff et al.
2008/0178402 A1 * 7/2008 Martines et al. ............... 15/53.2
2008/0229531 A1 * 9/2008 Takida ........................... 15/53.2
2009/0306812 A1 12/2009 Cottone et al.

FOREIGN PATENT DOCUMENTS

JP 59043307 A 3/1984
JP 2179403 A 7/1990
JP 07237270 A * 9/1995
JP 2003139509 A 5/2003
WO WO/2004/046644 A3 7/2004

OTHER PUBLICATIONS

Office Action from U.S. Appl. No. 12/431,500, dated Jul. 10, 2012, 9 pp.
Office Action from U.S. Appl. No. 12/431,500, dated Feb. 16, 2012, 8 pp.
Response to Office Action dated Feb. 16, 2012, from U.S. Appl. No. 12/431,500, filed May 16, 2012, 8 pp.
Response to Office Action dated Jul. 10, 2012, from U.S. Appl. No. 12/431,500, filed Sep. 10, 2012, 7 pp.
Notice of Allowance from U.S. Appl. No. 12/431,500, dated Sep. 17, 2012, 9 pp.

* cited by examiner

CONFIGURABLE APPLICATION OF A TIRE DRESSING

TECHNICAL FIELD

The disclosure relates generally to automated fluid application systems.

BACKGROUND

Car wash systems are commonly used by consumers or businesses to clean the exterior of vehicles, e.g., cars and trucks, of varying sizes. These systems are partially or fully automated to quickly wash, rinse, and dry automobiles, sometimes while the driver remains within the vehicle. In some systems, the car wash system methodically moves the car past stationary components of the car wash. In other systems, components of the car wash system move around the stationary vehicle. Still other car wash systems may incorporate vehicle motion and component motion to complete a car wash cycle. Car wash systems may employ brushes or rags that touch the vehicle and/or touch-less sprayers to clean the vehicle.

More recently, car wash systems have been designed to allow customers to choose additional services that are performed along with a standard car wash. For example, a standard car wash may simply include a rinse, a foam wash, and a dry cycle. The customer may desire to upgrade to more expensive car washes that may include undercarriage washes, double foam washes, hot wax applications, or another service that may enhance the visual appearance of the vehicle or protect the vehicle from weathering damage. In this manner, car was systems can be configured to provide further automated services beyond a standard wash of the vehicle.

SUMMARY

In general, the disclosure relates to an automated tire dressing system. Car wash systems are common for cleaning and protecting the exterior of numerous vehicles. These car wash systems may have varying degrees of automation and number of additional services selectable by the consumer. The tire dressing system described herein may be employed as a stand alone system or as one component in an automated car wash system to apply a tire dressing fluid to some or all tires of a vehicle within the car wash. In particular, the tire dressing system may be configured to accommodate tires of any size. The tire dressing system includes an imaging device that captures an image of a vehicle tire and at least one application device that applies the tire dressing fluid to the tire based on the captured image.

The imaging device captures an image of at least one of the tires on the vehicle. The system determines one or more tire parameters, such as tire width, tire height, inside radius, outside radius, etc., based on the captured image. The tire dressing system then configures at least one application device based on the tire parameters. Once configured, the application device applies the tire dressing to the tire. By determining the tire parameters, the tire dressing system may apply the tire dressing to the tire while reducing or minimizing application of tire dressing to the body or rims of the vehicle.

In one embodiment, the invention is directed to a method comprising capturing an image of a first tire on a vehicle, determining one or more tire parameters based on the captured image of the first tire, and automatically applying a tire dressing to the first tire based on the one or more tire parameters. The method may include determining at least one of a rim radius and a tire radius.

In another embodiment, the invention is directed to a system comprising an imaging device that captures an image of at least one tire on a vehicle, a processor that calculates one or more tire parameters of the tire based on the captured image, and an application device that applies tire dressing to the tire based on the tire parameters.

The details of one or more embodiments of the invention are set forth in the accompanying drawings and the description below. Other features of the invention will be apparent from the description and drawings, and from the claims.

DETAILED DESCRIPTION

Figure 1:
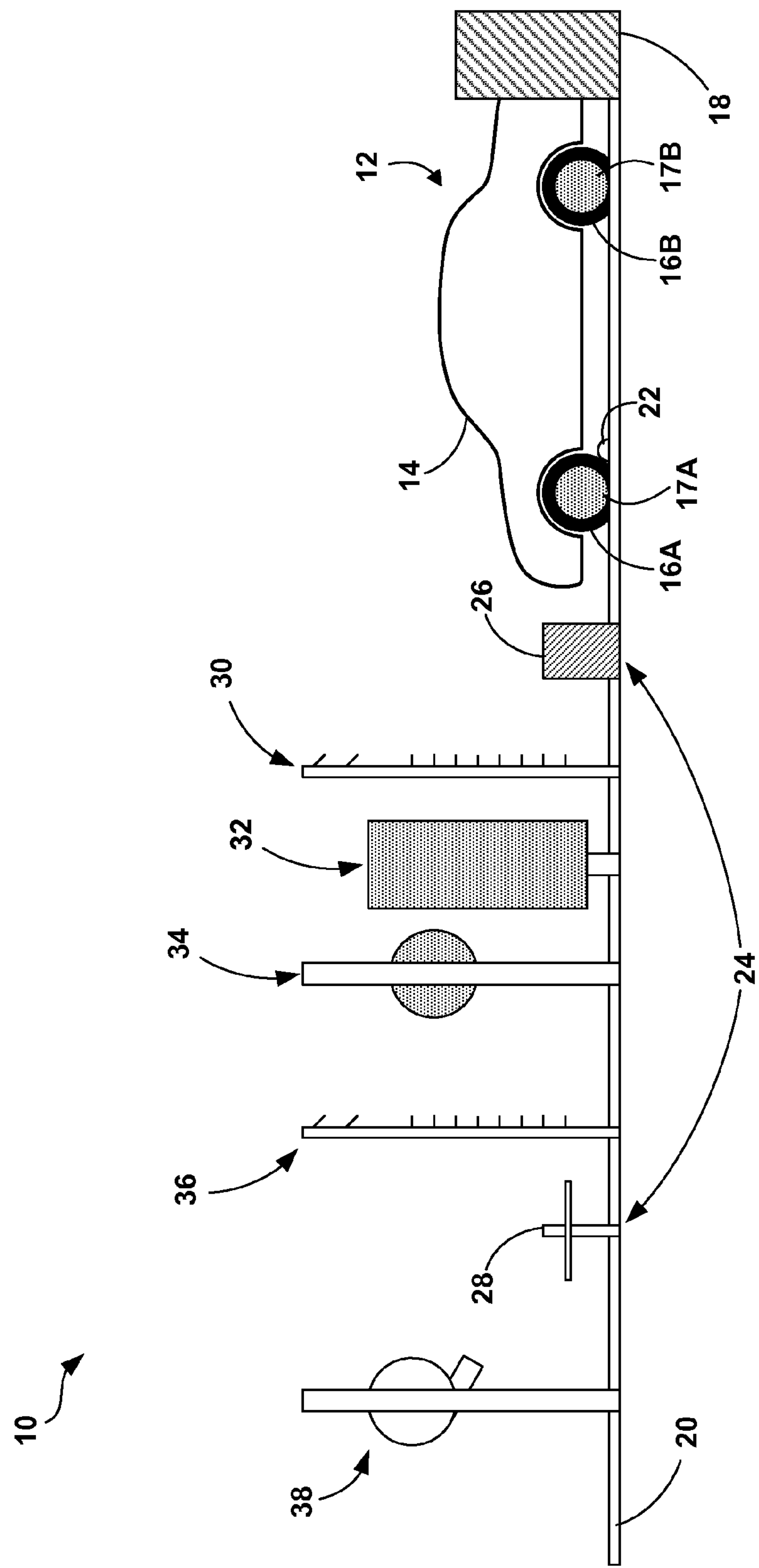
FIG. 1 is a conceptual diagram illustrating an example automated car wash system that includes an automated tire dressing system.

Car wash systems are employed to quickly clean the exterior of vehicles, typically consumer cars, vans, trucks, and other enclosed vehicles. Many car wash systems are fully automated, while other car wash systems incorporate some manual control. For example, in some car wash environments, one or more people may initially rinse the vehicle or spray detergent onto the vehicle before it is washed by an automated washing equipment. In addition, one or more people may hand dry the vehicle after a dryer sheds the majority of water from the vehicle.

As car wash systems evolve to employ more sophisticated technology, customers may be able to select from a greater variety of services beyond that of that of a standard car wash. These additional services may include an undercarriage wash, wheel scrub, hot wax, sealant, etc. Further, a tire dressing may be provided that applies a blackened matte or wet-look finish onto the sidewalls of the tires. However, it is usually desirable to apply tire dressings only to the sidewall surface of each tire. This is because application of tire dressing to the body or rims of the vehicle may quickly attract dirt and/or adversely affect the finish of these surfaces.

The tire dressing system disclosed herein may be used as a stand alone system or may be integrated into a fully or partially automated car wash system. An imaging device captures an image of at least one of the tires on the vehicle. The system determines one or more tire parameters based on the captured image. The tire parameter(s) may include, for example, the tire diameter from tread to tread, the sidewall height from rim to tread, the radius of the rim, the radius of the tire, and/or other tire parameters that may be used to define the boundaries of the tire sidewalls. The tire dressing system then configures at least one application device based on the tire parameter(s) such that the application device applies tire dressing within the boundaries of the tire sidewalls. By configuring the application device based on the determined the tire parameters, the tire dressing system may apply the tire dressing to the tire sidewalls while reducing or minimizing application of tire dressing to the body or rims of the vehicle.

The system may include one application device that applies tire dressing to all tires of a vehicle, or may include two application devices, each for the tires on one side of the vehicle. Each application device may be configured according to the tire parameters by activating certain spray nozzles, adjusting the spray angle of one or more nozzles, adjusting the position of the spray nozzles, some combination thereof, etc. The application device(s) may apply the tire dressing to the tire as the vehicle moves through an automated car wash system. Alternatively, the application device(s) may apply the tire dressing as the vehicle remains stationary at a standalone tire dressing station or a tire dressing station within an automated car wash system. The tire dressing system may also be an automated standalone system used by car manufacturers, car dealerships, or automobile detailers to quickly clean and shine the tires of customers' vehicles or of vehicles on the lot. The tire dressing system may also be incorporated into a larger system, such as a vehicle assembly line. In any case, the tire dressing system is not required to operate within a car wash system, and may operate as a standalone system or within another automated system.

FIG. 1 is a conceptual diagram illustrating an example automated car wash system 10 that includes a tire dressing system 24. As shown in FIG. 1, vehicle 12 has entered a car wash system 10. Car wash system 10 may include several components, or sub-systems, designed to clean, rinse and dry vehicle 12, such as a soak station 30, side brushes 32, top brushes 34, a rinse station 36, a dryer 38, and a conveyor system 20 that moves vehicle 12 through car wash system 10. Although car wash system 10 is shown as a system in which vehicle 12 is moved through the car wash system, other examples may be configured such that each component of car wash system 10 is incorporated into one or more moving arms that rotate or move around a stationary vehicle 12 to complete the car wash procedure.

Car wash system 10 also includes a tire dressing system 24 that applies a tire dressing to the tires 16 of the vehicle (the tires may be referred to herein alternately either in the singular, e.g., "tire 16" or in the plural, e.g. "tires 16"). Tire dressing system 24 of FIG. 1 includes an imaging device 26 and at least one application device 28. Although imaging device 26 is shown near the beginning of the car wash system, it shall be understood that imaging device 26 may be placed at any point along the car wash path of travel, and may be located in the same position as application device 28. Application device 28 would typically be located somewhere after the car washing components of car wash system 10, and may be located before or after dryers 38, depending upon the particular system set up.

Car wash system 10 may be controlled by a system computer 18. System computer 18 may include a user interface (not shown) that the customer or a car wash operator uses to input the type of car wash for vehicle 12. In some examples, only one type of car wash may be provided by car wash system 10. In such a case, system computer 18 may merely recognize when vehicle 12 is present, the customer has paid, and/or the system is ready to accept another vehicle 12. System computer 18 may also include a screen that displays information to the customer within car 12. Alternatively, if car wash system 10 provides multiple types of washes for vehicle 12, the screen of computer system 18 may provide information such as available car wash types, the type of car wash selected by a user, instructions before entering the car wash, or prompt the user when to drive vehicle 12 into car wash system 10.

In addition to interfacing with a user, system computer 18 functions to synchronize each component of car wash system 10 according to the position of vehicle 12 within system 10. In alternative examples, each component of car wash system 10 may independently determine the position of vehicle 12. Independent determination of vehicle 12 may depend upon the position of a roller 22 or other sensors that indicate when vehicle 12 is in the appropriate position with respect to each component.

Conveyor 20 or other automated mechanism moves vehicle 12 through the car wash. Conveyor 20 may include at least one roller 22 that, in this example, contacts the rear of tire 16A to push vehicle 12 at a speed controlled by system computer 18. In some examples, conveyor 20 may include more than one roller 22, and any roller 22 can contact any of tires 16 of vehicle 12. In some example car wash systems, conveyor 20 may move the vehicle at a substantially constant speed within car wash system 10. In other examples, conveyor 20 may increase speed, decrease speed, or stop vehicle 12 at predetermined positions within car wash system 10 for a particular procedure of the car wash cycle. System computer 18 may use the position of roller 22 and/or another independent sensor to determine the position of vehicle 12.

Soak station 30 may spray a soapy foam onto body 14. The soapy foam may be pumped through several nozzles positioned around vehicle 12 and aimed at the passing body 17. In alternative examples, the soapy foam may be a liquid, gel, or any other detergent capable of removing unwanted dirt and grime from vehicle 12. Further, multiple soaps or detergents may be applied at the same time from soak station 30.

As vehicle 12 continues through car wash system 10, side brushes 32 may be activated to contact the sides of vehicle 12 and, together with the already applied soapy foam, wash the sides of body 14, tires 16, and rims 17. Side brushes 32 may rotate in one direction or rotate back and forth to loosen dirt and grime from vehicle 12. Further, side brushes 32 may be configured to move laterally within car wash system 10 to optically contact vehicles of different widths. Side brushes 32 may be constructed of a soft fabric cloth, a flexible polymer foam, or some other material capable of contacting vehicle 12 to clean the vehicle without damaging the paint or finish of any parts of vehicle 12.

Top brushes 34 may contact and clean the upper surfaces of body 14. Top brushes 34 may be configured to move vertically in a track to start contacting the lower position of the front of body 14 and move upwards with the increasing height of body 14 to continually retain optimal contact with body 14. Although top brushes 34 may continually rotate in one direction, top brushes 34 may also agitate back and forth. Top brushes 34 may be constructed of substantially similar material to that of side brushes 32. In alternative examples, one or both of top brushes 34 and side brushes 32 may sway back and forth instead of rotating to gently loosen dirt from vehicle 12.

Once side brushes 32 and top brushes 34 have loosened all of the dirt from vehicle 12, vehicle 12 approaches rinse station 36. When triggered, rinse station 36 may spray clean water through nozzles at vehicle 12 to rinse the remaining dirt, grime, and soapy foam from vehicle 12. In some examples, rinse station 36 may also deliver a wax solution to protect body 14 and prevent further dirt from adhering to body 14. In any case, vehicle 12 is substantially clean after passing through rinse station 36.

Dryer 38 may include one or more blowers or fans that force air at vehicle 12 to substantially dry vehicle 12. One or more of the blowers may change in height to keep the blower nozzle close to the surface of body 14 to optimize drying efficiency. Further, one or more blowers may heat the air used to dry vehicle 12 more quickly. In alternative examples, car wash system 10 may employ a cloth drying component instead of or in addition to dryer 38.

Although car wash system 10 may operate independent of any other system, in some examples, car wash system 10 may be capable of communicating with remote users or remote computer systems. Thus, car wash system 10 may also include a communications link for communicating with an external device or system. The communications link may be controlled by a processor within system computer 18 to communicate with external devices via a local area network (LAN), wide area network (WAN), or the internet.

For example, car wash system 10 may be operated in conjunction with a gasoline service station. A terminal within the service station may communicate with car wash system 10 in order to authorize operation, identify errors, transmit customer codes after payment, or adjust operational parameters of car was system 10. In addition, the manufacturer or service company may retrieve use information from car wash system 10 to track the amount of chemical products or water used, the total number and type of wash cycles within a given period of time, identify any problems with the car wash system, or upgrade software or firmware to improve the functionality of car wash system 10.

Further, car wash system 10 may transmit materials requests when one or more consumables need to be replenished. For example, tire dressing system 24 may alert a supplier that the tire dressing solution is below a threshold level and should be replenished. Also, car wash system 10 may transmit an alert that soap needs to be replenished, brushes have reached the end of their useful life, or any other component needs to be replaced. This communication may help to ensure that car wash system 10 continues to operate automatically and with little manual oversight required.

Although the communications link may be hardwired to a network, the communication link may be configured for wireless telemetry with a networked computing device. In this manner, physical electrical connections may not be required to free up cable routing to and from car wash system 10. For example, the communication circuit may support radio frequency communications, e.g., IEEE 802.11 networking, IEEE 802.16 WiMAX networking, CDMA or GSM cellular protocols, or short distance near field communication and Bluetooth, or other wireless communication protocols.

Tire dressing system 24 may be installed within car wash system 10. It shall be understood that the imaging device 26 and application device 28 of imaging system 24 may be positioned within car wash system 10 at positions other than those shown in FIG. 1. For example, although in FIG. 1 application device 28 is positioned before dryer 38, application device 28 may be positioned anywhere after rinse station 36 or other components designed to clean the vehicle or its tires (to avoid washing off of applied tire dressing), whether before dryer 38 or after dryer 38. In addition, imaging system 26 may be located at any point in car wash system 10 prior to or adjacent to application device 28. The spacing of imaging device 28 and application device 28 within the car wash may vary depending upon the image processing algorithm used and the corresponding computation time required to process the image, thus allowing tire dressing system 24 adequate time, if necessary, to process the tire image(s) and to configure application device 28 without unduly increasing the total time required for the vehicle to complete the car wash cycle. The appropriate positioning of imaging device(s) 26 and application device(s) 28 may also vary depending upon the type of car wash (conveyor or stationary), the environment within the car wash, and the particular order and set up of car wash components within the car wash system, and the invention is not limited in this respect.

Tire dressing system 24 configures application device 28, based on one or more tire image(s) captured by imaging device 28, to substantially restrict application of tire dressing within the boundaries of the tire sidewalls. The tire dressing applied onto tires 16 from application device 28 may be a foam, a liquid, a mist, a gel, or any other product that can be applied to tires 16 and that leaves a blackened, matte or wet-look (depending upon the tire dressing product) finish on the outer sidewalls of tires 16.

Imaging device 26 may capture one or more images of the entire tire 16, or only a portion of tire 16, depending upon the requirements of the particular image processing algorithm used to determine the tire parameters. In some examples, the image(s) of a front tire 16A may be assumed to be representative of both tires on the front axle of vehicle 12. Alternatively, a second imaging device (not shown) may be installed on the opposite side of carwash system 10 to image tires on the other side of vehicle 12.

As the vehicle moves through car wash system 10, imaging device 26 may capture one or more images of rear tire 16B. The image(s) of tire 16B may be assumed to be representative of both tires on the rear axle of vehicle 12. Alternatively, a second imaging device (not shown) may be installed on the opposite side of carwash system 10 to image the tires on the other side of vehicle 12. Alternatively, image(s) of front tire 16A may be assumed to be representative of all of the tires on the vehicle. For the majority of vehicles passing through car wash system 10, all four tires 16 will be the same size. However, some vehicles 12 may have differently sized tires on the front axle than on the rear axle. For this reason, tire dressing system 26 may separately determine the size of tires on each axle of vehicle 12, or separately determine the size of each tire, in order to avoid inaccurate determination of tire parameters for some of the tires on the vehicle. In other examples, a user may indicate, via the user interface, whether tires on different axles are different sizes.

Tire dressing system 24 analyzes the image(s) to determine one or more tire parameters of the imaged tire 16. Tire dressing system 24 may employ any number of image processing techniques to determine the tire parameter(s). For example, system 24 may analyze the image(s) using digital, optical or analog signal processing techniques. Such signal processing techniques may include edge detection, corner/interest point detection, blob/region of interest detection, or other feature detection techniques to identify points in a digital or analog image which represent the boundaries of the tire sidewall and/or allow tire dressing system to determine the region occupied by the tire sidewall.

A single application device 28 such as that shown in FIG. 1 may apply tire dressing to both the front tire 16A and the rear tire 16B as the vehicle tires 16A and 16B are moved into the proper position with respect to application device 28. A second application device (not shown) may be installed on the opposite side of carwash system 10 to apply tire dressing to the tires on the other side of vehicle 12. The two application devices 28 on either side of carwash system 10 may operate substantially simultaneously for tires on the same axle. Alternatively, two application devices on each side of carwash system 10 may be used so as to simultaneously apply tire dressing to all four tires of a vehicle.

Tire dressing system may also include sensors that determine the distance between the application device 28 and the tire(s) 16. For example, for systems where vehicle 12 travels in a track on the driver's side of vehicle 12, such as that shown in FIG. 1, the distance between application device 28 and tires 16A and 16B on the driver' side of vehicle 12 is fixed. However, depending upon the width of the vehicle, the distance between passenger side application device 28 and the tires on the passenger side of vehicle 12 may vary. An ultrasonic, mechanical or other sensor may be present on the driver and/or passenger side of vehicle 12 that determines the distance between application device 28 and the tires on that side of the vehicle. The tire dressing system may then move the application device(s) to adjust the horizontal distance between the application device 28 and the tires 16. Alternatively, the tire dressing system may vary the manner in which application device 28 delivers the tire dressing based on this distance. For example, tire dressing system may cause the width of a spray nozzle to narrow or widen depending upon the distance between application device 28 and tires 16.

The example of FIG. 1 is merely one example of a car wash system 10 that includes tire dressing system 24. Other car wash systems may have components or sub-systems that operate in different orders or entirely different sub-systems than those described in FIG. 1 while still implementing tire dressing system 24. For example, some car wash systems may apply the tire dressing with applicator 28 after dryer 38 dries vehicle 12. As another example, an alternative car wash system 10 may include wash components, including a tire dressing system, that move around a stationary vehicle 12. Alternatively, car wash system may be a "touchless" system in which pressurized solutions are sprayed onto vehicle 12 to prevent unwanted contact and scratching of body 14. In still another example, tire dressing system 24 may be implemented in a manual car washing area where a user manually washes vehicle 12 and subsequently applies the tire dressing via tire dressing system 24. Those of skill in the art will readily recognize that the specific implementation of tire dressing system 24 may take many forms depending upon the environment in which it is to be installed and used, without departing from the scope of the present invention.

Figure 2:
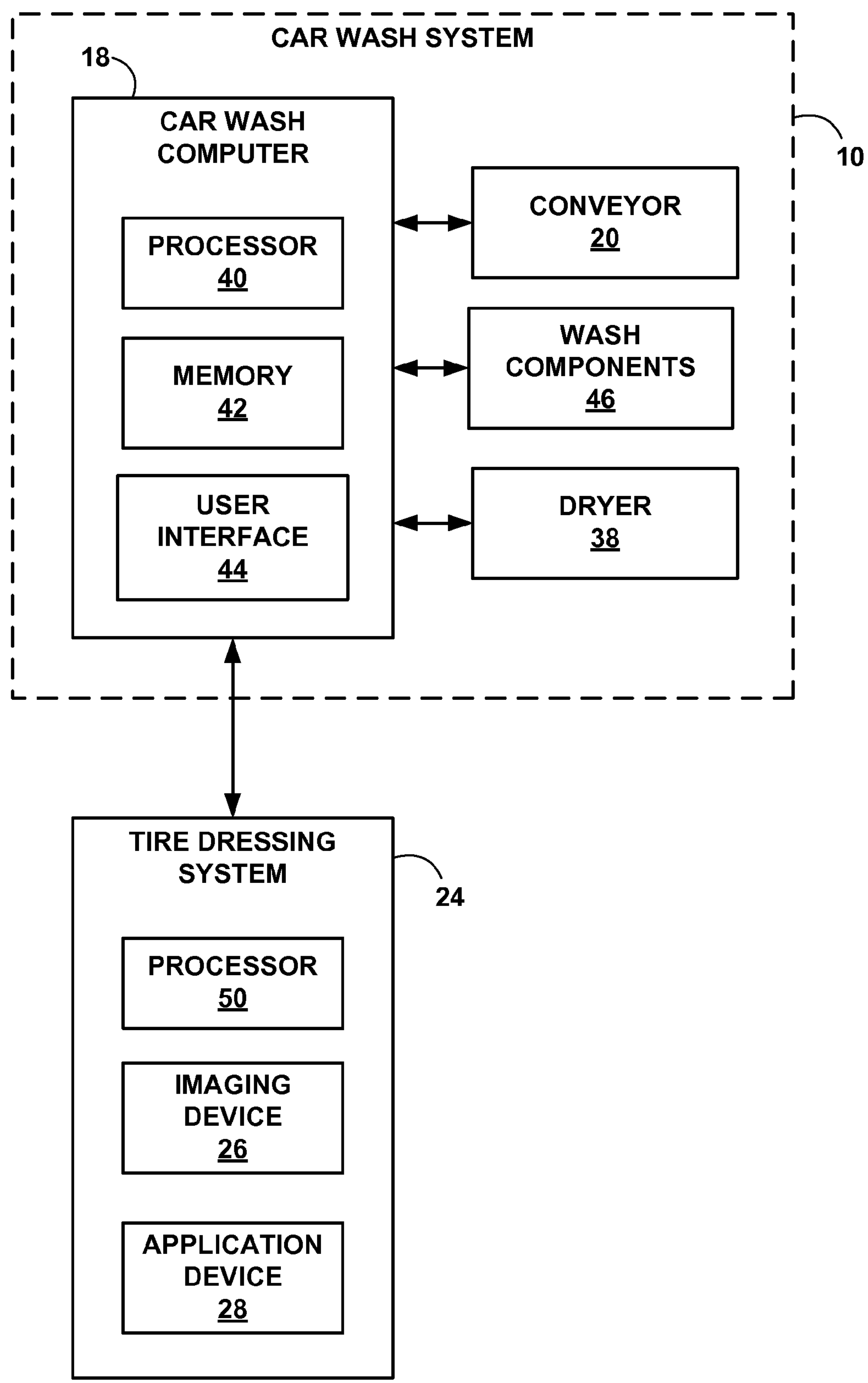
FIG. 2 is a functional block diagram of the example automated car wash system that includes an automated tire dressing system of FIG. 1.

FIG. 2 is a functional block diagram of the example automated car wash system and tire dressing system 24 of FIG. 1. As shown in FIG. 2, car wash system 10 includes a car wash computer 18 that includes a processor 40, memory 42, and user interface 44 that may or may not be physically contained within system computer 18. Processor 40 retrieves instructions stored within memory 42 to control the various functions of car wash system 10. Processor 40 also controls conveyor 20, wash components 46 and dryer 38. Car wash system 10 may interface with tire dressing system 24, as shown in FIG. 2. Alternatively, tire dressing system 24 may be another component of car wash system 10.

Memory 42 may store instructions for execution by processor 40, instructions for controlling any component of car wash system 10, types of car washing modes, user codes that control the car wash mode for vehicle 12, instructions for user interface 44, and any other information relevant to the operation of car wash system 10. In some examples, memory 42 may include separate physical memories for storing different sets of instructions, usage data of system 10, service information, user payment information, or any other information that could be physically separated for security or redundancy purposes.

Memory 42 may include an embedded memory within a circuit board of computer system 18 and removable memory that may easily be replaced to modify the control instructions for processor 40 and/or increase the storage space for data generated by one or more components or sensors of car wash system 10. In some cases, memory 42, or a portion thereof, may operate as a data logger and store use information of car wash system 10.

Although processor 40 may control each of the components within car wash system 10, one or more components may include one or more additional processors or circuits dedicated to controlling that particular component. Components described as processors within this disclosure may each comprise one or more processors, such as one or more microprocessors, digital signal processors (DSPs), application specific integrated circuits (ASICs), field programmable gate arrays (FPGAs), programmable logic circuitry, or the like, either alone or in any suitable combination.

Processor 40 controls user interface 44 as described in FIG. 1 with regard to computer system 18. User interface 44 provides information to a user, e.g., a driver of vehicle 12 or a service technician, about the type of car wash to be performed, services included in the selected type of car wash, payment information, when to enter car wash system 10, correct positioning of tires 16 to conveyor 20, washing status, or any other information related to car wash system 10. User interface 44 may provide different information to a service technician via a secure service menu. The service technician may then interrogate processor 40 to provide service or maintenance of car wash system 10.

User interface 44 may include any input and output devices that facilitate the communication between a user and car wash system 10. User interface may include a liquid crystal display (LCD), an organic light emitting diode display (OLED), light emitting diodes (LEDs), a cathode ray tube (CRT), illuminated panels, a touchscreen, pointing devices, a keyboard, buttons, or any other devices. User interface 44 may also include multiple displays or input devices located at the entrance to car wash system 10 and/or throughout the car wash to provide information to the user.

Generally, processor 40 may provide instructions to and/or receive communications from conveyor 20, wash components 46, and dryer 38 to complete the car wash. For example, these components may provide error information, the position if vehicle 12, or other information pertinent to the washing of vehicle 12.

In the example of FIG. 2, tire dressing system 24 includes a processor 50 that controls imaging device 28 to capture one or more images tire(s) 16, and controls application device 28 to substantially restrict application of the tire dressing within the boundaries of the tire sidewalls. Alternatively, tire dressing system 24 may not include a dedicated processor, but rather may be controlled via processor 40 or car wash system 10. Processor 40 may generally communicate with tire dressing system 24 to indicate when the car wash system 10 has started, any specifics of vehicle 12, the type of tire dressing to apply if multiple options are available, and to coordinate the application of the tire dressing with the other components of car wash system 10.

In addition, tire dressing system 24 may communicate with processor 40 to determine the speed of vehicle 12 through car wash system 1O. Tire dressing system 24 may utilize the speed of vehicle 12 and the tire parameters 16 determined by imaging system 26 to calculate the distance vehicle 12 will need to travel to ensure that tire dressing is applied to the entire tire sidewall. In this manner, application device 28 may be operated for a precise period of time to completely coat each tire 16 without applying excess tire dressing to a portion of each tire 16 already treated by the dressing and without applying tire dressing to the body or rims of vehicle 12.

Figure 3:
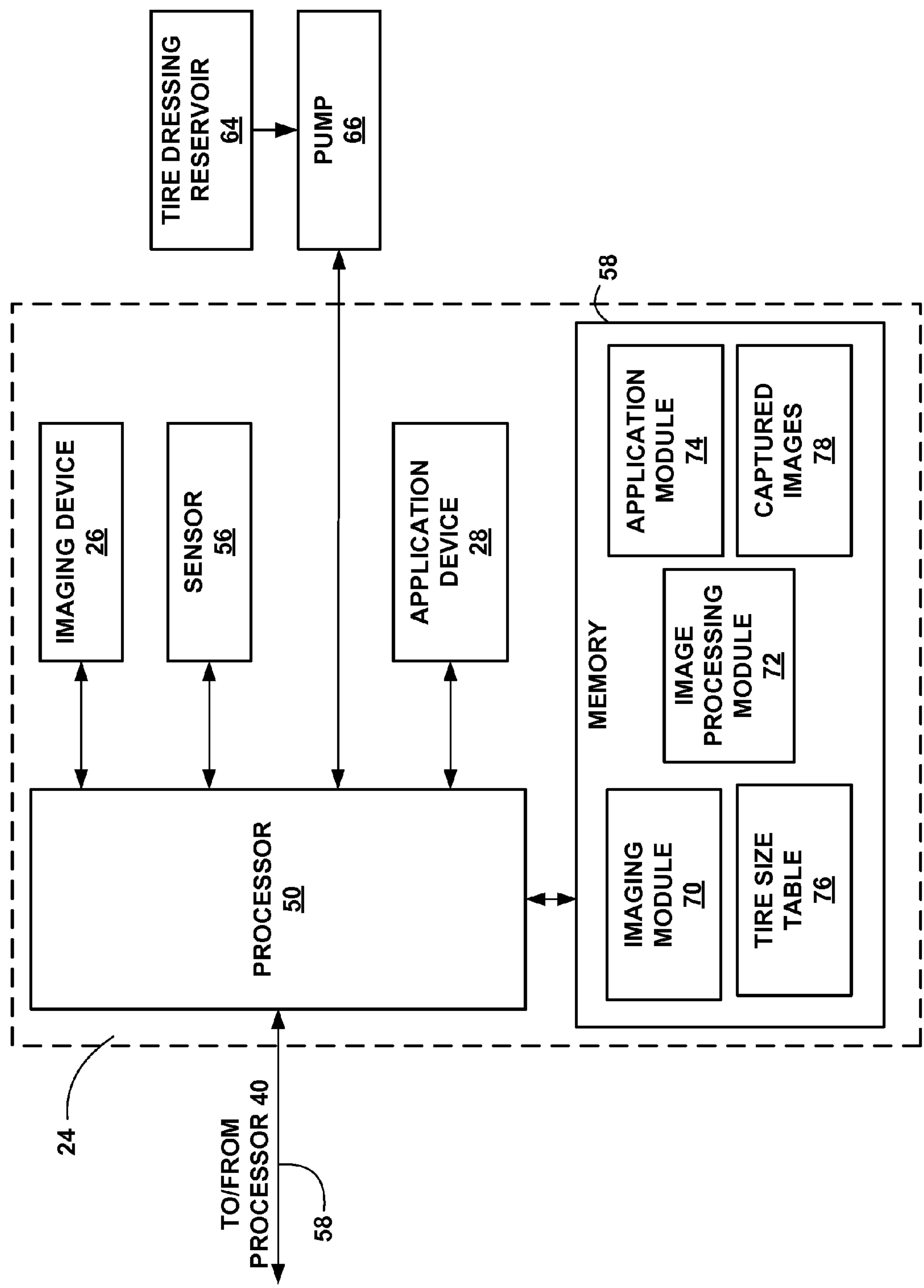
FIG. 3 is a functional block diagram of an example tire dressing system.

FIG. 3 is a more detailed functional block diagram of an example tire dressing system 24. Tire dressing system 24 includes processor 50, imaging device 26 and application device 28. System 24 also includes a sensor 56 and a memory 58. Processor 50 controls imaging device 26 and sensor 56 based upon software instructions stored within memory 58. Memory 58 contains software by which processor 50 controls various aspects of tire dressing system 24. This software includes, for example, an imaging module 70, an image processing module 72, and an application module 74. Imaging module 70 contains software that controls operation of imaging device 26. For example, imaging module 70 may contain software that controls the timing of image capture and the configuration of the imaging device (e.g., aperture size, shutter speed, flash, etc.). Imaging processing module 72 contains software that analyzes the captured tire image and determines one or more tire parameters that define the boundaries of the tire sidewalls. Application module 74 configures application device 28 based on the determined tire parameters so that application of tire dressing is substantially restricted to within the boundaries of the tire sidewalls of the imaged tire.

Memory 58 may also store a tire size table 72. Tire size table 72 may include a table of tire parameters corresponding to a variety of commercially available tires. Images captured by imaging device 26 may be stored in memory 58 as captured images 76.

Sensor 56 detects when a tire is properly positioned within the field of view of imaging device 26 so that imaging device 26 may capture an image of the tire. For example, sensor 56 may detect when a tire is adjacent to imaging device 26, when a tire is in front of the lens of imaging device 26, or otherwise detect when a tire is properly positioned for imaging device to capture an image. Sensor 56 may include a tape switch, an optical sensor, a laser sensor, a pressure sensor, a mechanical trigger, or any other sensor that is capable of detecting the presence of a tire. Sensor 56 may be positioned on the floor, in which case the sensor would be triggered when the tire 16 rolls over it; sensor 56 may be positioned to the side of the vehicle, such as with an optical detection scheme; or sensor may be a mechanical switch triggered when contacted or pushed forward by the presence of tire 16. In some examples, sensor 56 may also determine the distance between imaging device 26 and tire 16. Processor 50 may control when sensor 56 is operational and interpret the signals produced by sensor 56 based upon the instructions stored in memory 58. In some examples, sensor 56 may include multiple sensors to determine the position of a tire. In alternative examples, sensor 56 may operate in cooperation with another vehicle positioning system, such as conveyor 20. Those of skill in the art will readily appreciate that the specific sensor implementations listed are exemplary only and that the invention is not limited in this respect.

Imaging device 26 may also include an optional motor (not shown). Since tire size may differ greatly between types of vehicles, the motor may alter the position or angle of imaging device 26 based upon the output of sensor 56. However, if imaging device 26 is configured to appropriately image any tire without being mechanically moved, a motor for the imaging device may not be required.

When the tire is properly positioned, imaging device 26 captures at least one image of tire 16. Multiple images may be captured in order to make confirmation measurements of one or more tire parameters or have a backup image if a first image cannot be processed. Imaging device 26 may utilize a digital camera that includes an image sensor, such as a charge coupled device (CCD) or complementary metal oxide semiconductor (CMOS), that convert light into electrical charges. The electrical charges in the detector may create a visual image, e.g., a digital photograph, of the tire. However, imaging device 26 may utilize any type of camera or image sensor capable of creating a digital image or an image that can be digitized. Imaging device 26 may also include a light source, such as a flash, (not shown) to illuminate tires 16. The flash may illuminate tires 16 when conditions are otherwise too dark to create an image of tires 16. Use of a flash may also increase the image contrast between the rim and the tire sidewalls, or between the tire sidewalls and the background of the image, permitting image processing module 72 to more accurately identify features of the tire and thus to accurately determine the tire parameters. In other examples, imaging device 26 may image a tire with at least one of visible light, infrared (IR) light, radio waves, microwaves, or ultrasound.

Once imaging device 26 captures the one or more images of the tire 16, the captured image(s) are transferred and stored as captured images 78 in memory 58. Processor 50, executing instructions in imaging processing module 72, analyzes the image(s) to determine one or more tire parameters of the imaged tire 16. The tire parameter(s) are generally those parameters of the tire that generally define the boundaries of the tire sidewalls or the region occupied by the tire sidewalls. Imaging processing module 72 may include any number of image processing techniques capable of determining the tire parameter(s). For example, image processing module 72 may analyze the image(s) using digital, optical or analog signal processing techniques. Such signal processing techniques may include edge detection, corner/interest point detection, blob/region of interest detection, or other feature detection techniques to identify points in a digital or analog image which represent the boundaries of the tire sidewall and/or define the region occupied by the tire sidewall.

Edge detection, for example, may identify points at which the image brightness changes sharply, e.g., those points at which discontinuities are present, and so to discriminate the location of a tire edge within the image from the image background. Processor 50 may detect changes in pixel properties to identify edges of the tire or the boundary between the tire sidewall and the rim. Changes in pixel color, for example, may allow processor 50 to differentiate between the tire sidewall and the rim (the tire sidewall boundary at the inner radius of the tire sidewall), and/or the tire sidewall and the image background (the tire sidewall boundary at the outer radius of the tire sidewall). In this manner, processor 50 may identify the edges of the tire and count the number of pixels between the inner radius of the tire sidewall and the outer radius of the tire sidewall. Using a pixel to length conversion equation, processor 50 may convert the pixel measurements to units of measure, e.g., centimeters or inches to determine the tire sidewall height. Other tire parameter(s) may also be determined using similar image processing techniques.

Blob detection, for example, may identify the region occupied by the tire sidewalls and/or the tire rim. The blob corresponding to the rim may be identified due to high contrast between the black tire sidewalls and the typically metallic rim of the tire, especially when a flash is used to illuminate the tire when the image is captured. Once the blob corresponding to the rim is identified, the radius/diameter of the blob/rim may be determined. The radius/diameter of the tire may also be determined. These measurements in turn corresponds to predetermined tire parameters that may be used to configure application device 28.

Those of skill in the art will readily recognize that many different image processing techniques may be used to determine the tire parameter(s), and that the invention is not limited in this respect. Imaging processing module 72 may also include multiple sets of instructions for calculating the one or more tire parameters so that processor 50 may confirm the measurements with differing image processing methods.

Several commercially available image processing systems may be used to implement portions of imaging module 70. Examples include Machine Vision/Image Processing LabVIEW tools available from National Instruments (NI) of Austin, Tex., and Presence Plus vision sensors and software available from Banner Engineering Corp. of Minneapolis, Minn.

Once the one or more tire parameters that define the boundaries of the tire sidewall are determined, processor 50, executing instructions in application module 74, configures application device 28 based on the tire parameters to substantially restrict application of tire dressing to within the boundaries of the tire sidewall. For simplicity and not by way of limitation, the boundaries of the tire sidewalls or the region occupied by the tire sidewalls that are defined by the tire parameter(s) may be referred to herein as the "boundaries/regions" of the tire sidewalls or simply as "boundaries" of the tire sidewalls. Application module 74 may include predetermined configuration information for application device 28 based upon the one or more tire parameters. Depending upon the type of application device 28, the configuration information may indicate the height of the application device 28, which nozzles are active, the size of each nozzle opening, or any other relevant applicator configuration information.

In some examples, processor 50 may configure application device 28 based directly on the one or more tire parameters calculated by image processing module 72. Alternatively, processor 50 may refer to a tire size table 76 to make a final determination of the tire parameter(s). Tire size table 76 may store known tire parameters corresponding to a plurality of known commercially available tires. For example, after the image processing module 72 calculates one or more tire parameters, processor 50 may compare the calculated tire parameters with known tire parameters stored in tire size table 76. Processor 50 may retrieve the known tire parameter(s) corresponding to the commercially available tire that most closely matches the calculated tire parameter(s) to use in configuring each applicator device 28. For example, tire size table 76 may include measurements corresponding to a plurality of commercially available tires or tire size numbers, e.g., 225/50R17. In this example tire size number, the number 225 identifies the cross section of the tire in millimeters, 50 indicates the sidewall aspect ratio, and R17 stands for the rim diameter in inches (or approximately 43.18 centimeters).

Application device 28 may be capable of adjusting one or more dimensions, nozzle openings, or spray pressure. This adjustment may allow application device 28 to substantially restrict application of tire dressing to the within the boundaries of the tire sidewalls while minimizing the amount of tire dressing applied to the body or rims of the vehicle. The configuration of the application device 28 may vary depending upon the particular type of application device 28 and the tire parameters.

Application device 28 may also include a sensor (not shown) that detects when a tire is properly positioned with respect to application device 28 for the tire dressing to be applied. The application device sensor may include a tape switch, an optical sensor, a laser sensor, a pressure sensor, a mechanical trigger, or any other sensor that is capable of detecting the presence of a tire. The application device sensor may be positioned on the floor, in which case the sensor would be triggered when the tire 16 rolls over it; or, the application device sensor may be positioned to the side, such as with an optical detection scheme. In some examples, the application device sensor may also determine the distance between application device 26 and tire 16. Alternatively a different sensor may determine the distance between the application device 28 and the tire 16. Processor 50 may control when the application device sensor is operational and interpret the signals produced by the application device sensor based upon the instructions stored in memory 58. In some examples, the application device sensor may include multiple sensors to determine the position of a tire. In alternative examples, the application device sensor may operate in cooperation with another vehicle positioning system, such as conveyor 20. Those of skill in the art will readily appreciate that the specific sensor implementations listed are exemplary only and that the invention is not limited in this respect.

Processor 50, executing application module 74, also controls the operation of application device 28 during application of the tire dressing. Application device 28 may include a motor (not shown) that moves an applicator 62 according to the position of tires 16 and vehicle 12. Depending upon the form of the applicator 62, applicator 62 may be moved along with the vehicle in a direction substantially parallel to the direction vehicle 12 moves through car wash system 10. In addition, or alternatively, applicator 62 may rotate to direct the tire dressing to different surface areas of the tire sidewalls. In some examples, conveyor 20 may move applicator 62 so that applicator moves along with the vehicle 12. In other examples, more mechanical or electrical actuators may control the operation of application device 28. For example, one or more applicators 62 may be actuated by a small electrical actuator device according to the commands of processor 50.

The tire dressing itself may be stored within a tire dressing reservoir 64. Processor 50 may control a pump 66 that pumps the tire dressing from the reservoir 64 and deliver it to application device 28 via one or more fluid delivery tubes. Processor 50 may control the pressure and/or flow rate of the tire dressing produced by pump 66. In some examples, more than one pump 66 may be employed to deliver the tire dressing to application device 28. One or more sensors may also be employed within tire dressing reservoir 64, within any of the tubes connected to pump 66, or at applicator 62 to monitor the pressure and/or flow rate of the tire dressing and/or the amount of tire dressing remaining in reservoir 64.

In alternative examples, application device 28 may include a separate processor or control circuitry that operates application device 28. In this manner, processor 50 would not directly control motor 60 and pump 66, for example. Instead, processor 50 may communicate instructions to the processor of application device 28 to be carried out independently by the processor of application device 28. In addition, application device 28 may have other components that allow one or more application devices 28 to operate at least somewhat independent of imaging system 26.

Although tire dressing system 24 may include multiple application devices 28, communication and control of one application device 28 is described herein for simplicity. Generally, for example, tire dressing system 24 may include an application device 28 on each side of vehicle 12 to apply the tire dressing to opposing tires on the same axle at approximately the same time. It shall be understood that the control and configuration of the application device 28 described herein applies to each application device actually installed in any given tire dressing system.

A lateral tire position may indicate where the outside wall of each tire is in relation to a home position of application device 28. Since vehicles 12 have different widths, the position of each tire 16 may change between vehicles. Therefore, sensor 56 or a different sensor within car wash system 10 may determine the lateral tire position of vehicle 12. In some examples, each application device 28 may move towards the respective tire until a proximity sensor stops the application device at the appropriate distance. This distance may be a function of the tire parameters and/or of the particular application device 28.

Application module 74 may also include instructions for applying the tire dressing to the tire using application device 28. For example, these instructions may specify fluid pressures of the tire dressing, delivery sequences, delivery durations, movements required of application device 28 to substantially restrict application to within the boundaries of the tire sidewalls, or any other information necessary to apply the tire dressing. Application module 74 may also include error instructions to handle potential errors by application device 28 during delivery of the tire dressing.

In some examples, memory 58 may store additional information during the operation of imaging device 26 and tire dressing system 24. For example, memory 58 may store use information regarding the number of cycles tire dressing system 24 is operated. Further, memory 58 may update tire size table 72 with new tire size exceptions if the calculated measurements of the tire do not correspond to a tire size number already stored within tire size table 72. Memory 58 may also store statistics about the frequency certain tire size numbers are retrieved to make sure that tire dressing system 24 is capable of treating all tires 16 that enter car wash system 10.

Figure 4A:
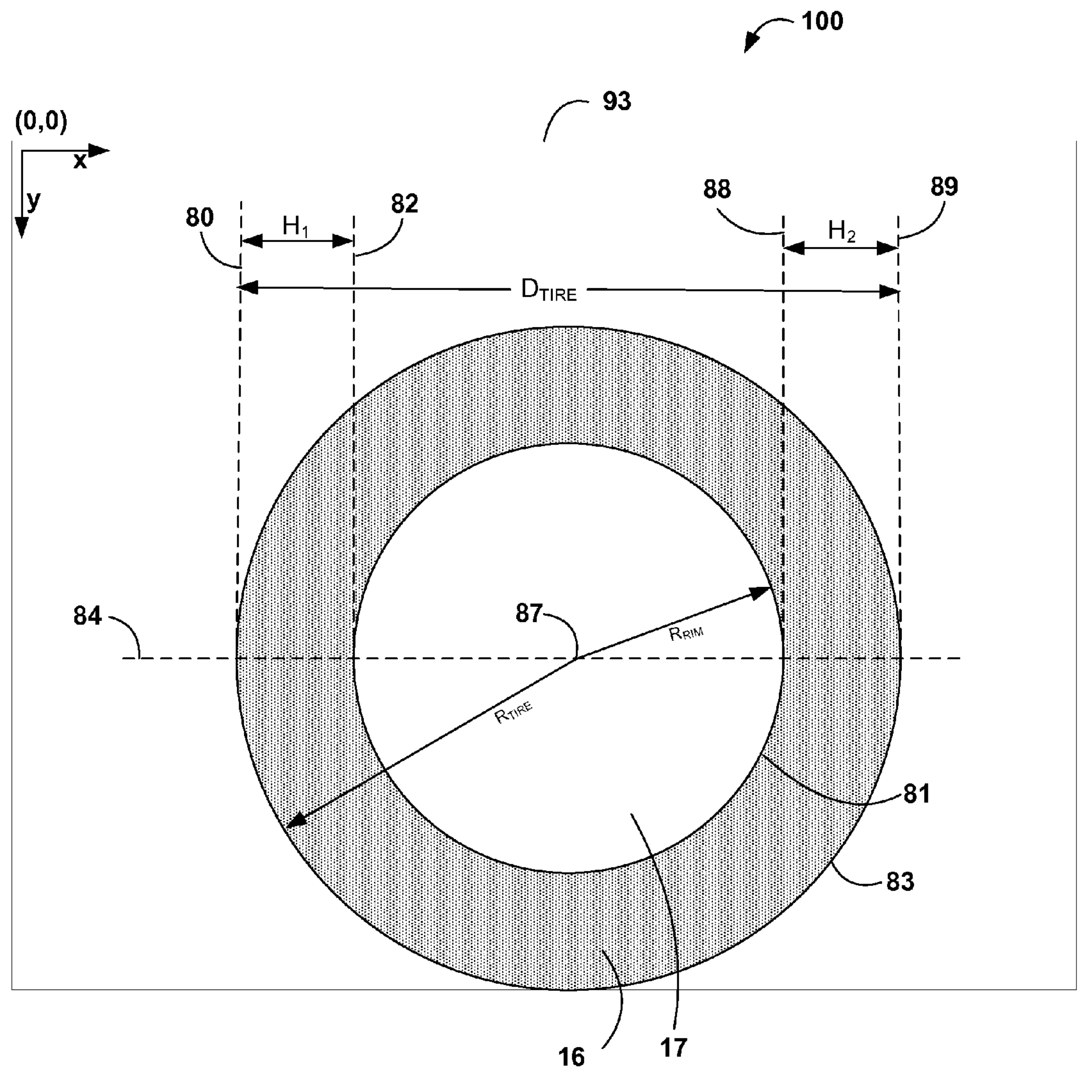
FIG. 4A is a conceptual diagram illustrating an example wheel and tire with example tire parameters that may be measured by the imaging system.

FIG. 4A is a conceptual diagram illustrating an example image 100 of a tire 16. Image 100 includes an image boundary 93 and in which the upper left hand corner is defined, for purposes of illustration and not by way of limitation, as the origin. The directions of the x-axis and y-axis are also illustrated in the upper left hand corner, and follow the commonly accepted definition with the x-axis running horizontally and the y-axis running vertically and with the x-axis and the y-axis are perpendicular to each other. Those of skill in the art will readily understand that the origin and x-axis and y-axis could be defined in many different ways, and that they are arbitrarily assigned for purposes of determining relative distance between pixels within the image, and that he invention is not limited in this respect.

Tire 16 includes a midpoint 87, a rim radius $R_{RIM}$ defined as the distance between the midpoint and the rim/tire inner sidewall boundary 81 that separates the rim and the tire sidewall, and a tire radius $R_{TIRE}$ defined as the distance between the midpoint and the outer sidewall boundary 83 that represents the tread surface of the tire 16. Tire 16 also includes a tire diameter $D_{TIRE}$ defined as twice the tire radius, $R_{TIRE}$. Inner sidewall boundary 81 and outer sidewall boundary 83 define the boundaries of the tire sidewall, a substantially donut shaped area or region to which application of tire dressing is substantially restricted to reduce application of tire dressing to the body or rims of the vehicle.

The diagram of FIG. 4A may be used to illustrate one example process by which image processing module 72 may determine one or more tire parameters for tire 16. For example, processor 50 may analyze a digital image of tire 16 and rim 17 to identify a leading vertical edge 80 of tire 16. Processor 50 may scan the image in a vertical line from the left side of the image until the leading vertical edge 80 is identified, or may use some other method known to those of skill in the art. The pixel representative of the leading vertical edge 80 may then be marked. Processor 50 may continue to scan horizontally (e.g., parallel with the ground) until a rim/tire boundary 82 is identified and the representative pixel is marked. The number of pixels, or distance, between leading vertical edge 80 and rim/tire boundary 82 is then measured and converted to determine the tire sidewall height, $H_1$.

The pixel of leading vertical edge 80 may be used to identify a tire midline 84. Processor 50 may further analyze the image of tire 16 and rim 17 to identify rim/tire boundary 88 and trailing vertical edge 89. Processor 50 may then determine the tire diameter, $D_{TIRE}$, by determining the distance between leading vertical edge 80 and trailing vertical edge 89. Tire sidewall height $H_2$ may also be measured by determining the distance between rim/tire boundary 88 and trailing vertical edge 89. Tire sidewall height $H_2$ may be used to calculate an average sidewall height between $H_1$ and $H_2$ to reduce any measurement abnormalities. However, either one, both or an average sidewall height may be used to generate the tire size.

The radius of the rim, $R_{RIM}$, may be determined as one half the distance between rim/tire inner sidewall boundary 82 and rim/tire inner sidewall boundary 88. The radius of the tire, $R_{TIRE}$, may be determined as one half of the tire diameter, $D_{TIRE}$. The midpoint 87 may be identified as being a distance of $R_{RIM}$ away from either leading vertical edge or trailing vertical edge and lying along the midline 84 of the tire.

Knowledge of the radius of the rim $R_{RIM}$, and the radius of the tire, $R_{TIRE}$, for example, would allow image processing module to determine the location of the inner and outer tire sidewall boundaries 81 and 83, respectively. Alternatively, knowledge of the tire sidewall height $H_1$ and radius of the tire $R_{TIRE}$, would allow processor 50 to determine the tire size of tire 16. The relevant tire parameter(s) may be determined, for example, from tire size lookup table 72 or generated via an equation.

Conversion of pixels in the digital image to distance may be performed with pixel calibration. Calibration of the pixels may be performed at the initial installation of tire dressing system 24, but may be performed periodically during the operation of imaging system 26. The calibration determines the width of each pixel in millimeters, centimeters, inches, or any other desired measurement unit. This calibration is then multiplied by the number of pixels to calculate the actual distance in the desired units between two pixels of interest.

Figure 4B:
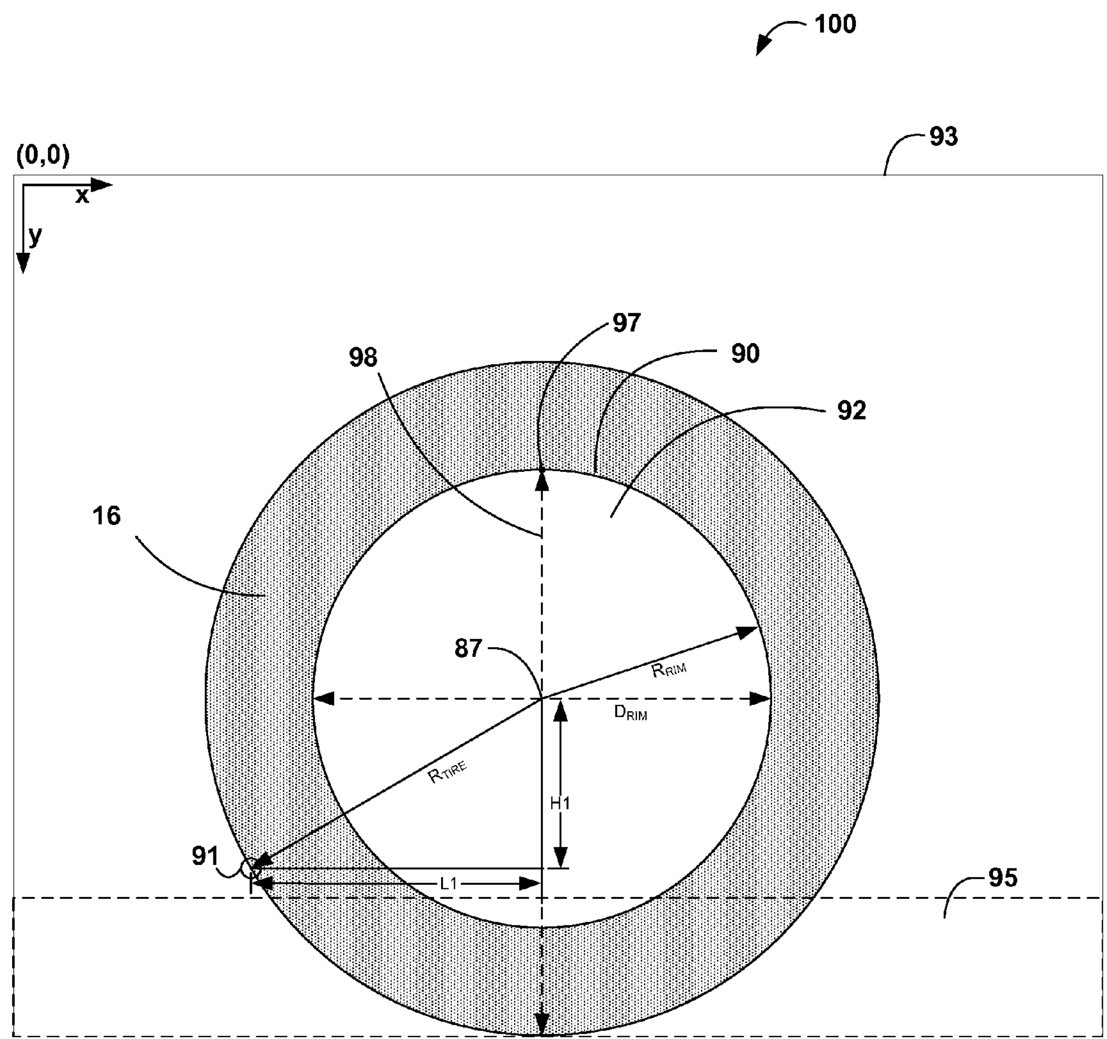
FIG. 4B is a conceptual diagram illustrating an example image processing technique for determining tire parameters.

FIG. 4B is a conceptual diagram illustrating an example image processing technique for determining tire parameters. In this example, image processing module 72 uses blob detection image processing techniques to determine the tire parameters. Imaging device 26 captures an image 100 of tire 16. In this example, imaging device 26 is positioned to capture an image 100 of the whole tire 16. In other examples, however, imaging device may capture an image of only a portion of tire 16. A boundary 93 indicates the extent of tire image 100.

For most vehicles, a relatively well defined area defined by boundary 90 between the rim and the tire will be detectable in image 100. This is due to a difference in material, reflectivity and/or color between the rim and the black sidewalls of tire 16. Typically the rim, which is often fabricated of a metallic and/or relatively reflective material, will appear as relatively brighter in image 100 than the sidewall of tire 16, which is generally black in color. In some environments, this may be true even under ambient light conditions. In other environments, a relatively simple lighting setup, such as a single LED or fluorescent flash, or other lighting setup, could be used to provide further illumination of the imaged tire and to provide the desired contrast between the rim and the tire.

In some applications, such as certain car washes, for example, a guide rail 95 may be physically present between the camera and the tire, and may obscure a portion of the tire sidewall and/or the rim of the tire when image 100 is taken. However, guide rail 95 may not be present in all applications, may be located on the other side of the vehicle so as not to interfere with image 100, or may otherwise not affect image 100. Depending upon whether guide rail 95 will be present in image 100, image processing module may use a different process to determine the tire parameters.

Image processing module 72 receives and analyzes image 100 using, in this example, blob detection techniques to identify a blob 92 within the image. Blob 92 corresponds to the rim of the tire. For those applications where guide rail 95 does not obscure any of the rim (blob 92) in image 100 (in other words, those applications where the entire rim is visible in image 100), image processing module 72 analyzes image 100 to find the midpoint 87 of blob 92. Image processing module 72 next finds the diameter of blob 92 by determining the horizontal distance of blob 92 at the midpoint 87. The diameter of blob 92 corresponds to the diameter of the rim and is indicated as $D_{RIM}$ in FIG. 4B. One half the diameter of the rim corresponds to the radius of the rim, $R_{RIM}$.

For those applications where guide rail 95 obscures a portion of the rim (blob 92) in image 100 (in other words, those applications where the entire rim is not visible in image 100, such as is shown in FIG. 4B), image processing module 72 may use a slightly different algorithm to find the midpoint 87 and diameter of blob 92. For example, image processing module 72 may determine the maximum horizontal distance of blob 92. This corresponds to the diameter of the blob, and thus the diameter of the rim, $D_{RIM}$. Image processing module 72 may also determine the topmost point 97 on blob 92. Image processing module 72 may determine the blob radius, $R_{RIM}$, by dividing the blob diameter, $D_{RIM}$, by two. Image processing module 72 may identify the location of midpoint 87 of blob 92 within the image by starting at the position of topmost point 97 and moving in the vertical direction toward the interior of the blob by the distance $R_{RIM}$.

In this example, the radius of the tire, $R_{TIRE}$, may also be determined. Ambient or focused lighting may provide sufficient contrast so that image processing module may distinguish between the outer edge of the tire and the wheel well or the background environment. Alternatively, a single dot or arbitrary dot technique, described below, may be employed so that tire dressing system 24 need not rely on the contrast between the outer edge of the tire and its surroundings.

As discussed above, sensor 56 detects presence of the tire 16 within the field of view of imaging device 26, which triggers imaging device 26 to capture the image of the tire 16. In some example systems, a sensor 56 is tripped when a tread edge of the tire contacts the sensor. As a result, the physical position of sensor 56 corresponds to a tread edge of the tire when the image is captured. In other words, the physical position of sensor 56 when the image is captured corresponds to a point on the circumference of the tire, $R_{TIRE}$.

For those applications where the physical position of sensor 56 is visible in the tire image (e.g., either physically positioned in such a way that it is not obscured by guide rail 95 or when guide rail is not present), the location of sensor 56 may be used to determine the radius of the tire, $R_{TIRE}$. FIG. 4B illustrates one such example. The location of sensor 56 within image 100 may be made more apparent by placing a single dot 91 having contrast from its surroundings on the sensor such that dot 91 is visible in the captured image 100. For example, dot 91 may be placed on the back of the senor on the side toward imaging device. This dot 91 (with some mathematical correction) may be considered the outer edge of the tire. Since midpoint 87 of the tire is already known from the blob detection described above, image processing module 72 may determine the distance from the position of midpoint 87 to the position of dot 91 within image 100. This distance corresponds to the radius of the tire, $R_{TIRE}$.

For example, $R_{TIRE}$ may be determined using the Pythagorean theorem:

$$R_{TIRE}=\sqrt{((L1)^2+(H1)^2)}, \text{ where}$$

$H_1$=(vertical distance from midpoint 87 to bottom image boundary)−(vertical distance from dot 91 to bottom image boundary) and $L1$=(horizontal distance from midpoint 87 to left image boundary)−(horizontal distance from dot 91 to left image boundary).

Once $R_{RIM}$ and $R_{TIRE}$ are known, the tire parameters may be determined by referencing a lookup table as described above.

Figure 4C:
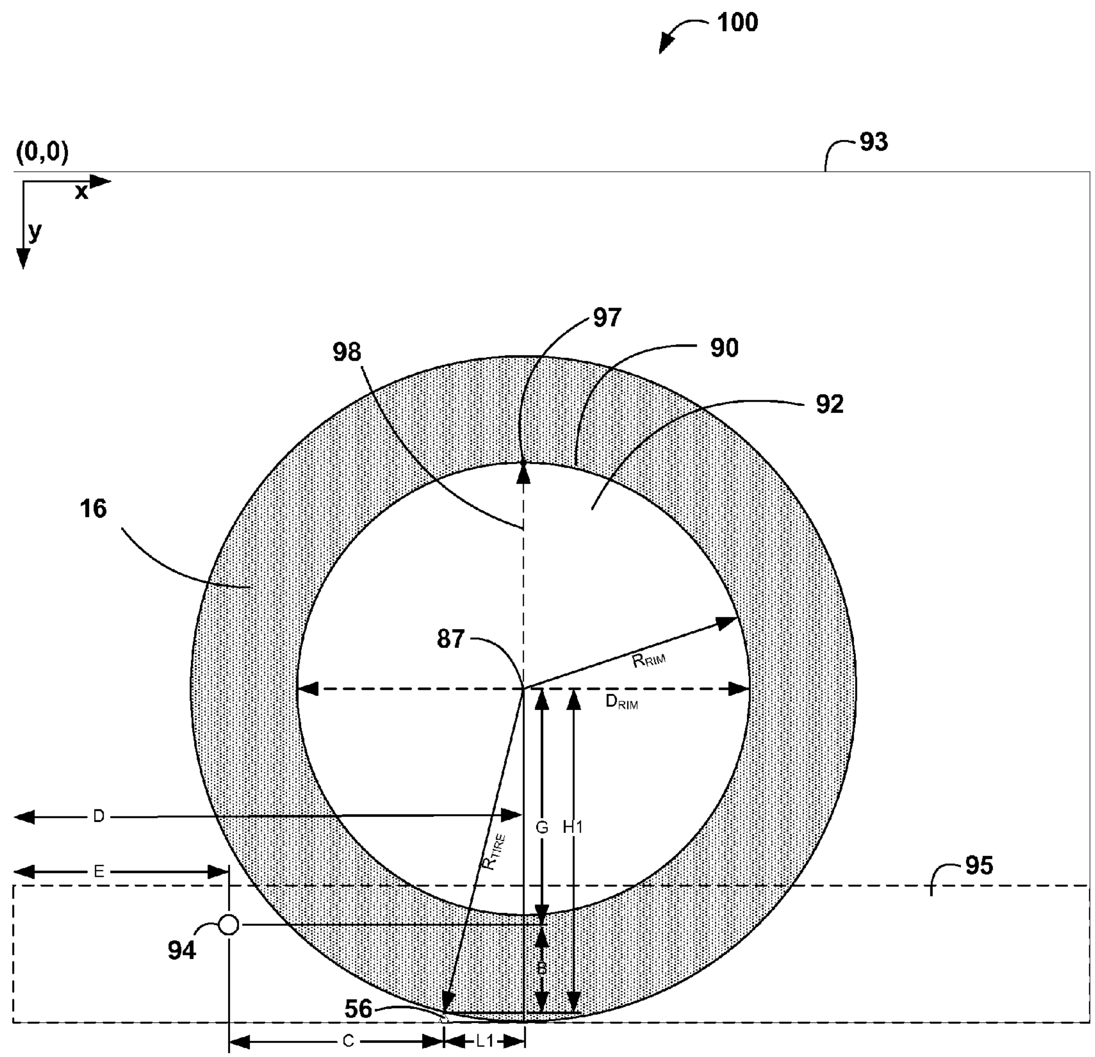
FIG. 4C is a conceptual diagram illustrating an example image processing technique for determining tire parameters.

FIG. 4C shows an example of an imaging processing technique which may be used for those applications where the physical position of sensor 56 is not visible in the tire image (e.g., physically positioned in such a way that it is obscured by guide rail 95). In this example, when the system is installed, an arbitrary dot 94 may be placed at a known position with respect to sensor 56. For example, arbitrary dot 94 may be placed a known horizontal distance C and a known vertical distance B from the position of sensor 56. In this example, sensor 56 is a tape sensor or other sensor positioned on the floor of the environment in which tire dressing system 24 is installed. The thickness of sensor 56 may be very close to zero but is shown larger in FIG. 4C for purposes of illustration.

The midpoint 87 of the tire 16 may be determined using one of the techniques described above. Then, L1 and H1 may be determined as follows:

$$L1=(D-(E+C)) \text{ and}$$

$$H1=(G+B), \text{ where}$$

B=(known vertical distance between sensor 56 and arbitrary dot 94)

C=(known horizontal distance between sensor 56 and arbitrary dot 94)

D=(horizontal distance from left image boundary to midpoint 87)

E=(horizontal distance from left image boundary to arbitrary dot 94), and

G=(vertical distance from midpoint 87 to arbitrary dot 56).

Once again, the radius of the tire, $R_{TIRE}$, may be determined using the Pythagorean theorem:

$R_{TIRE}=\sqrt{((L1)^2+(H1)^2)}$.

Once the radius of the rim, $R_{RIM}$, and the radius of the tire, $R_{TIRE}$, are known, the tire parameters necessary to configure application device 28 may be determined. In some examples, the dimensions $R_{RIM}$ and $R_{TIRE}$ may be used directly to configure application device 28. In other examples, tire size table 76 may store rim radius and tire radius information for a plurality of commercially available tires. Image processing module 72 may use the dimensions $R_{RIM}$ and/or $R_{TIRE}$ as indices into tire size table 76 to determine the corresponding tire sizes and/or tire parameters which should be used to configure application device 28. The resulting tire parameters may then be used to configure application device 28 so that application of the tire dressing is substantially restricted to within the boundaries of the tire sidewalls.

In other examples, imaging device may capture an image of only a portion of tire 16, or the image of the tire may be obstructed by objects in the car wash environment. The tire size may be determined by measuring a chord. If the chord is measured a known height above the ground 96, then the diameter of the blob (or other image processing technique) can be calculated through use of an equation. Or, as another example, if two chords are measured, the perpendicular bisectors of the two chords will meet in the center of the blob. Once the center is known, the maximum horizontal distance may be used to determine the diameter of the rim, or, alternatively, the radius of the rim may be determined using the relationship:

$$\text{chord length}=2\sqrt{r^2-d^2}$$

where r is the radius of the circle, and d is the perpendicular distance from the chord to the circle center Other geometric relationships may also be used to determine the tire size, rim size, and tire parameters depending upon the particular image processing techniques used, the amount of the information contained in the image (e.g., how much of the tire imaged, whether in whole or in part), etc. It shall therefore be understood that there may be many different ways to combine image processing and geometric techniques to determine the tire parameters, and that the invention is not limited to the particular examples given above.

In some examples, the image processing described herein may take into account variation in the radius of a tire. For example, the tire radius of a weight bearing pneumatic tire may be somewhat less at points where the tire is in contact with the ground (due to weight induced compression of the tire) than at other points around the circumference of the tire. However, in some examples, these variations may be so small as to not significantly affect the tire parameter calculations. Alternatively, these variations may be accounted for during image processing. For an above ground sensor (such as shown in FIG. 4B, for example) any variation in tire radius due to weight bearing compression of the tire may not adversely affect the tire parameter calculations, because the tire radius is not being measured at a point where the tire contacts the ground in that example. Even when the sensor is located on the ground (such as shown in FIG. 4C, for example) sensor 56 may be tripped just as the tire contacts the ground, and therefore any variation in the tire radius due to weight bearing compression may be minimal. As such, the variation in radius may either be ignored if it is small enough, or corrected for using a correction factor if the variation is more significant. Those of skill in the art will recognize that variations in tire parameters due to tire compression may be determined for each individual tire dressing system installation, and may be accounted for, if necessary, using various techniques, and that the invention is not limited in this respect.

FIGS. 5A-5D are conceptual diagrams illustrating example application devices 28. It shall be understood that these application devices are exemplary only and that the invention is not limited in this respect.

Figure 5A:
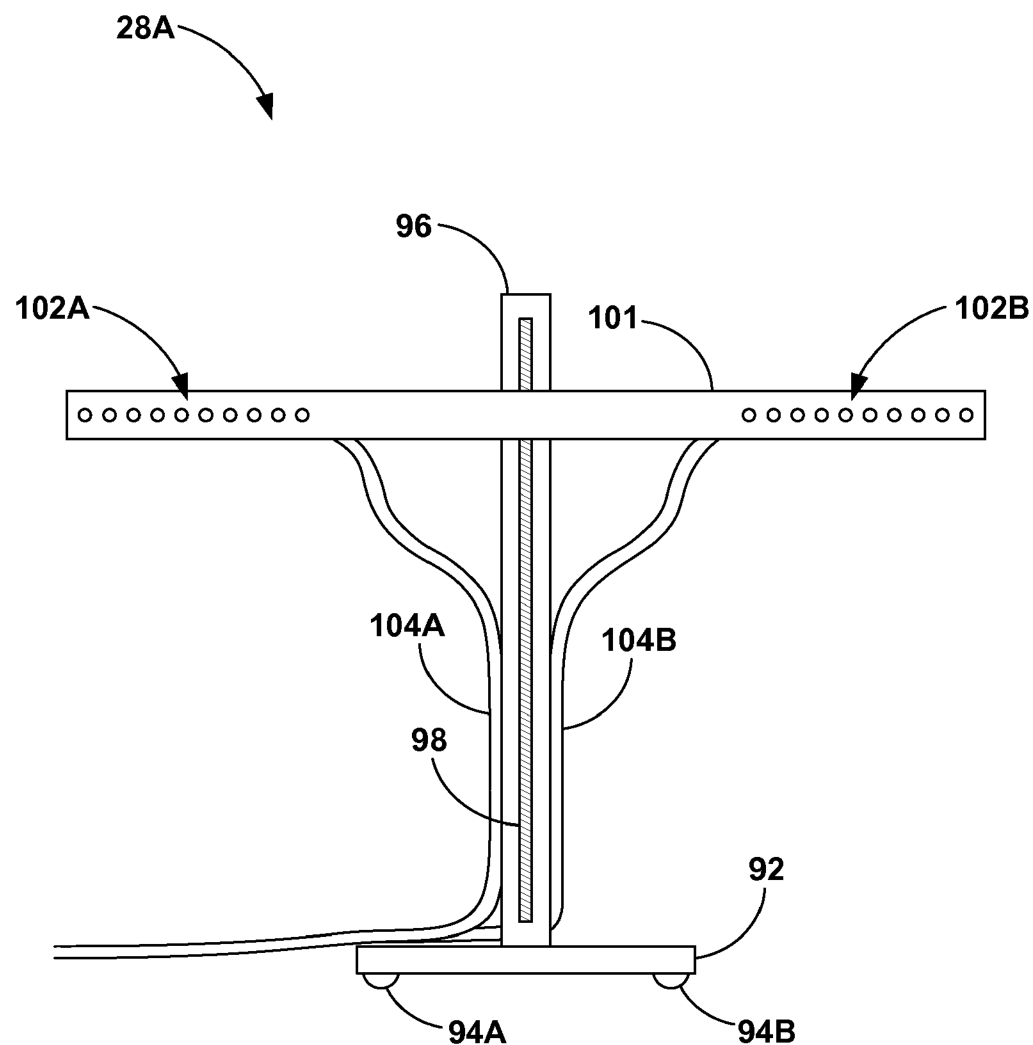
FIG. 5A is a conceptual diagram illustrating an example tire dressing applicator having an adjustable height sprayer bar.

FIG. 5A is a conceptual diagram illustrating an example application device 28A having an adjustable height sprayer bar 101. Application device 28A includes a sprayer bar 101 and spray nozzles 102A and 102B. Application device 28A may also include a base 92, rollers 94A and 94B, a tower 96, an adjustment screw 98, and tire dressing lines 104A and 104B. Processor 50 configures application device 28A based on the one or more tire parameters and controls application device 28A to substantially restrict application of tire dressing to within the boundaries of the tire sidewall. For example, certain of spray nozzles 102A and 102B may be activated or deactivated depending upon the one or more tire parameters, such as the height of the tire sidewall. That is, certain of spray nozzles 102A (and 102B) may be activated or deactivated such that the total length of active spray nozzles 102A (and 102B) corresponds to the sidewall height. Sprayer bar 101 may be stationary and apply tire dressing to the tire of a moving vehicle. Alternatively, sprayer bar 101 may rotate about its center for those applications where the vehicle is stationary while tire dressing is being applied. In any event, the position of spray nozzles 102A and 102B allows application device 28A to simultaneously deliver the tire dressing to two different circumferential areas of a tire. Complete tire dressing coverage of tire 16 may be completed in half a revolution of tire 16 or half a revolution of sprayer bar 101.

Base 92 supports tower 96 and may move substantially parallel to the direction of vehicle 12 on rollers 92A and 94B. Rollers 94A and 94B may sit on a track that resides parallel to conveyor 20. A motor (not shown) may control the movement of application device 28A along the track or conveyor 20 and may move application device 28A at the same speed as roller 22 and vehicle 12. In some examples, tower 96 or the track may be moved laterally relative to vehicle 12 to optimize the distance between spray nozzles 102A and 102B and tires 16. In other examples, application device 28A may be stationary for those applications where the vehicle is stationary while tire dressing is applied.

In addition, the overall height of sprayer bar 101 may be adjusted to accommodate tires of differing diameters. For example, sprayer bar 101 may be moved vertically along tower 96 until the middle of sprayer bar 101 is positioned at a height equal to the midpoint 87 of tire 16. One or more spray nozzles 102A and 102B, depending upon the determined tire size, are opened or otherwise activated and any sprayer nozzles 102A or 102B that are not needed (i.e., those that are outside the determined tire size) are closed or deactivated to prevent overspray of tire onto the body or rims of vehicle 12. Tire dressing may be pumped from tire dressing source 64, through one or more tire dressing lines 104A and 104B, and delivered to spray valves 102A and 102B, respectively.

Sprayer bar 101 may include two sets of spray nozzles 102A and 102B. Although in this example each set of spray nozzles 102A and 102B includes ten individually controlled spray nozzles, sprayer bar 101 may be implemented using as few as one spray nozzle may be used and as many as one hundred or more spray nozzles. The opening (or otherwise activating) of each spray nozzle 102A or 102B may be independently controlled such that the total length of active spray nozzles 120 corresponds to the one or more tire parameters, such as the sidewall height. In other examples, tire dressing fluid may be prevented from entering each spray nozzle by independently controlled valves for each spray nozzle. In other examples, each set of spray nozzles 102A and 102B may be attached to extendable arms that slide along sprayer bar 101 to adjust to varying tire sizes.

Figure 5B:
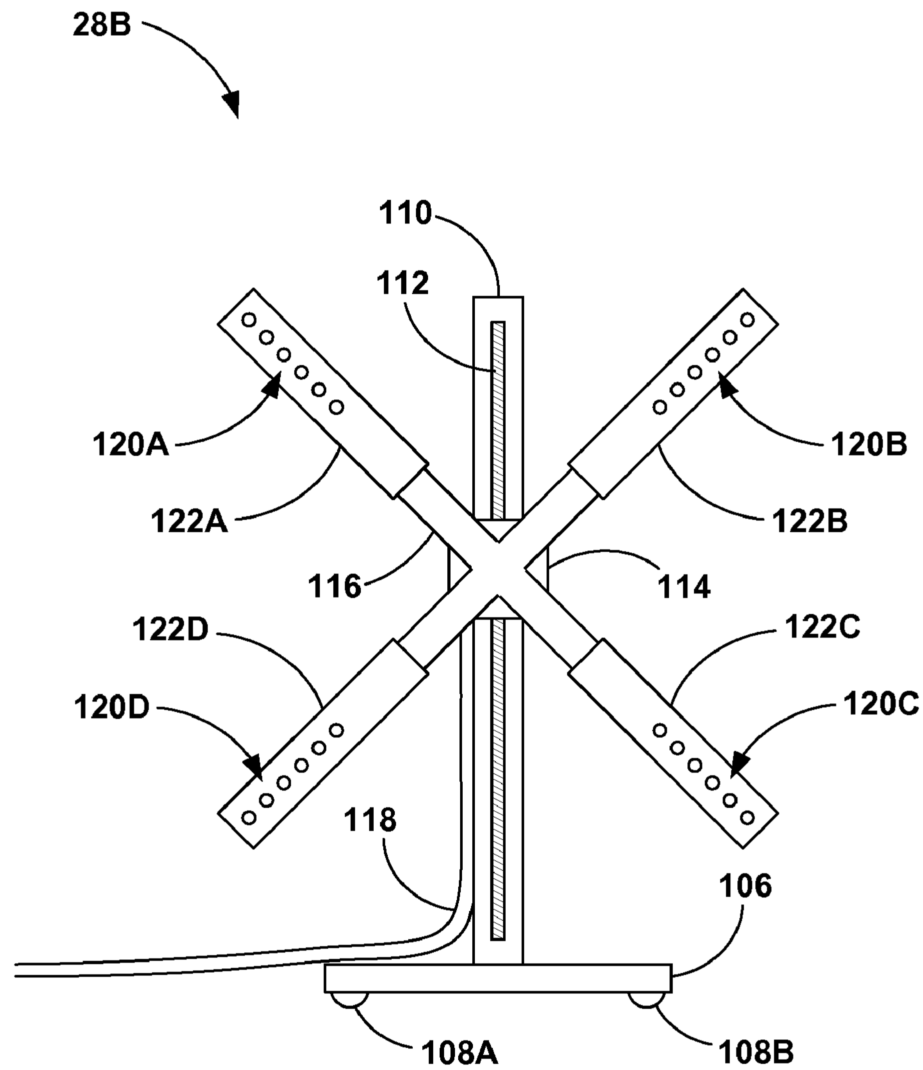
FIG. 5B is a conceptual diagram illustrating an example tire dressing applicator having adjustable length sprayer arms.

FIG. 5B is a conceptual diagram illustrating another example application device 28B having four adjustable length sprayer arms 122A, 122B, 122C, and 122D (collectively sprayer arms 122), each having respective spray nozzles 120A, 120B, 120C, and 120D (collectively "spray nozzles 120). Application device 28B may also include a base 106, rollers 108A and 108B, a tower 110, an adjustment screw 112, a collar 114, cross-member 116, sprayer arms 122, and tire dressing line 118. The position of spray nozzles 120 on sprayer arms 122 allows application device 28B to simultaneously deliver the tire dressing to four different circumferential areas of a tire.

Application device 28B may be configured similarly to application device 28A as described above. Similarly, application device 28B may move along with the vehicle via rollers 108A and 109B, or may be stationary for those applications where tire dressing is applied to a stationary vehicle.

In the example of FIG. 5B, sprayer arms 122 are adjustably coupled to cross-member 116. Either individually or collectively, sprayer arms 122 may be moved by one or more motors along the respective posts of cross-member 116. Certain of spray nozzles 120 may be activated or deactivated such that the total length of active spray nozzles 120 corresponds to the one or more tire parameters, such as the sidewall height. Adjustable sprayer arms 122 allow application device 28 to deliver tire dressing to tires of many different sizes and tire wall widths. Cross-member 116 may be statically fixed to collar 114. However, other examples may allow cross-member 116 to rotate with respect to collar 114 in the opposite direction of rotating tires 16. Therefore, the tire dressing may be applied to the tire in a limited horizontal movement of vehicle 12 through car wash system 10. Complete tire dressing coverage of tire 16 may be completed in a fourth of a revolution of tire 16.

Figure 5C:
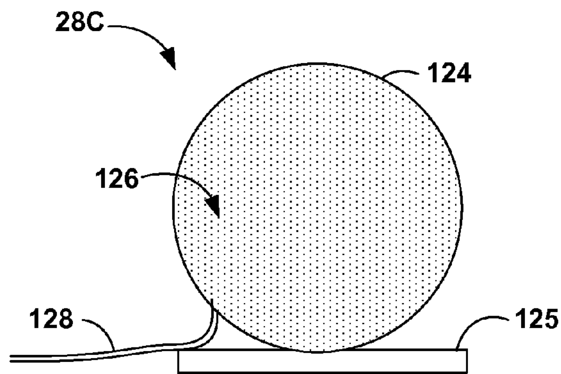
FIG. 5C is a conceptual diagram illustrating an example tire dressing applicator having an array of controllable spray nozzles.

FIG. 5C is a conceptual diagram illustrating another example application device 28C. Application device 28C includes a delivery array 124 having a plurality of spray nozzles 126. Application device 28C may also include a base 128 and rollers 130A and 130B. Each of the plurality of spray nozzles 126 may be independently activated based on the one or more tire parameters to apply the tire dressing to the entire outer side wall of the tire while reducing or minimizing overspray of the tire dressing to the body or rims of vehicle 12. For example, the spray nozzles 126 falling within the boundaries of the tire sidewall may be activated, while those spray nozzles 126 lying outside the boundaries of the tire sidewall may be deactivated. As with applications devices 28A and 28B, the vehicle may be stopped when adjacent to the delivery array 124 during the time that tire dressing is applied or the delivery array 124 may move along with the vehicle.

Figure 5D:
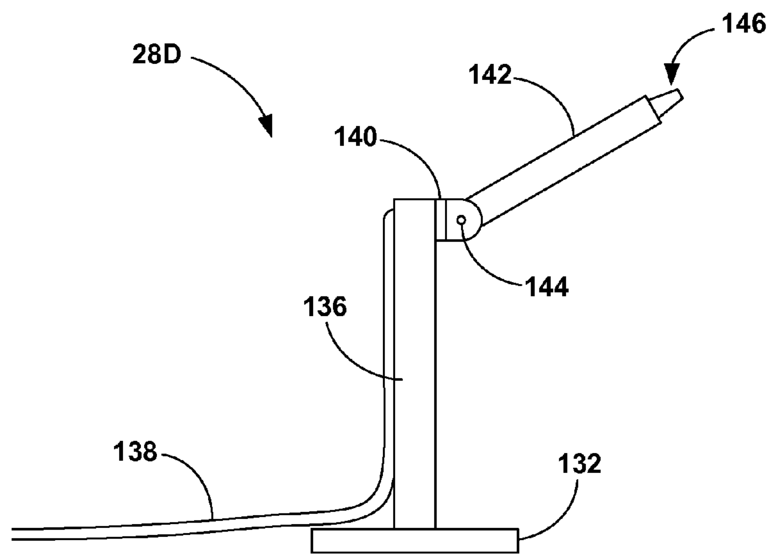
FIG. 5D is a conceptual diagram illustrating an example tire dressing applicator having an articulated spray arm.

FIG. 5D is a conceptual diagram illustrating another example application device 28D having an articulated spray arm 142. In FIG. 11, the outer side wall of tires 16 is in a plane perpendicular to the plane of view. Application device 28D includes a pivot joint 133, an articulated spray arm 142 and a spray nozzle 146. Application device 28D may also include a base 132, rollers 134A and 134B, a tower 136, a collar 140, and a tire dressing line 138. Processor 50 configures application device 28D and so controls movement of articulated spray arm 142 based on the tire parameters. For example, processor 50 may adjust the angle of articulated spray arm 142 with respect to tower 136. To do this, processor 40 may adjust the vertical position of collar 140 such that the center of collar 140 substantially aligns with the center of the tire. Articulated spray arm 142 may rotate about the plane of collar 140 and trace the circular path of the tire sidewall to substantially restrict application of tire dressing to within the boundaries of the tire sidewall.

In addition, the spray angle of spray nozzle 146 may be adjusted based on the one or more tire parameters. Specifically, the spray angle of spray nozzle 146 may be configured to correspond to the tire sidewall height; e.g., the spray angle of spray nozzle 146 may be narrowed for smaller tire sidewall heights and widened for larger sidewall heights. Spray nozzle 146 may be actuated using an electrical, electromechanical, or mechanical component. The spray angle may be adjusted by widening the outer cone of spray nozzle 146, positioning an angled pin at various depths within the outer cone, or other method known in the art. The diameter of the delivered spray area may range from 1.0 centimeter to more than 20 centimeters. In this manner, application device 28D may be configured to substantially restrict application of tire dressing to within the boundaries of the tire sidewall.

In certain vehicles, portions of the tire sidewall may be obscured behind part of the vehicle body. Application device 28 may be configured to apply tire dressing to the tire sidewalls without applying tire dressing to those portions of the vehicle body extending down over the tire sidewalls.

Figure 6:
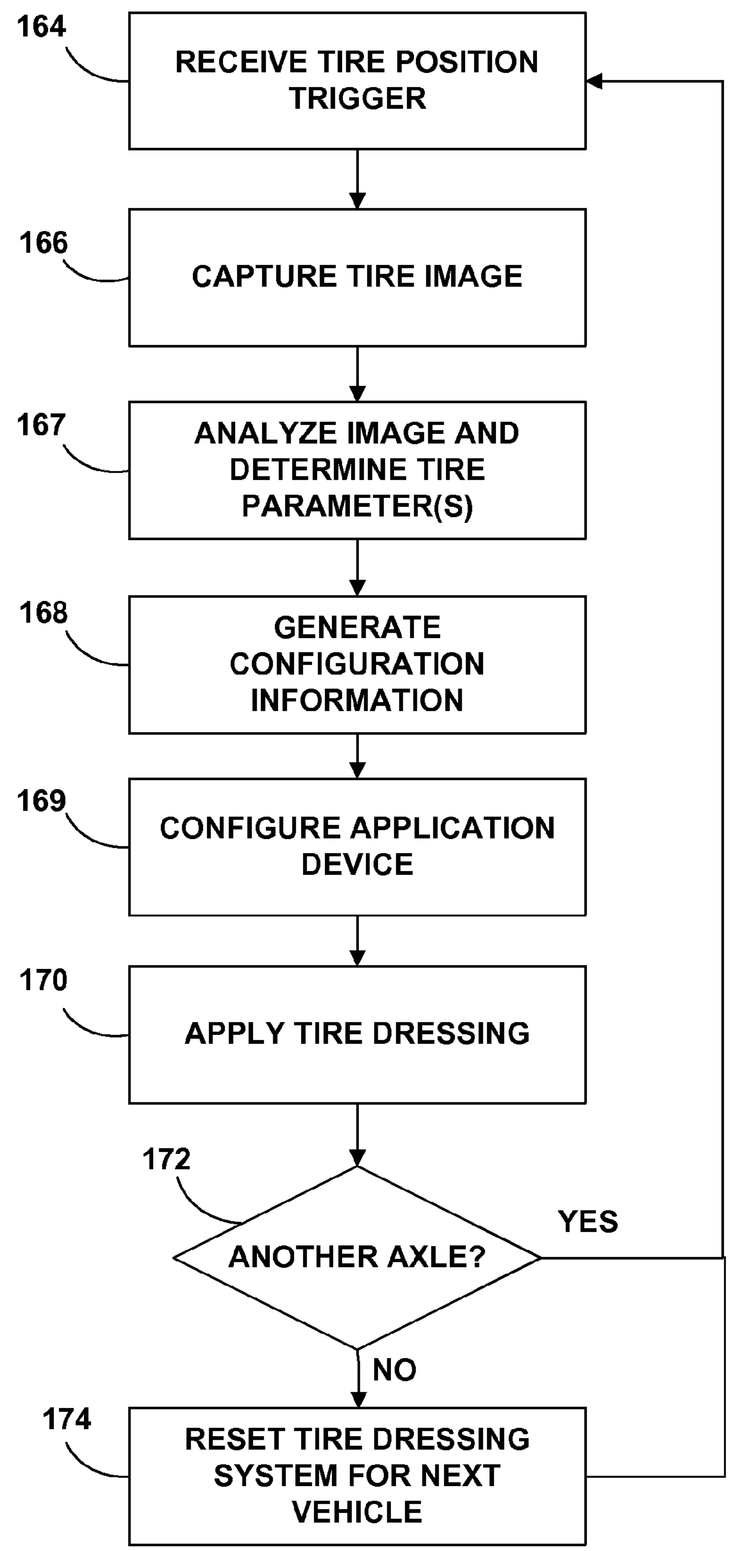
FIG. 6 is a flow diagram illustrating an example process that determines one or more tire parameters based on a captured tire image and applies a tire dressing to the tire.

FIG. 6 is a flow diagram illustrating an example process by which tire dressing system 24 determines one or more tire parameters and applies a tire dressing to a tire. As vehicle 12 approaches imaging device 26 within car wash system 10, processor 50 receives the tire position trigger from sensor 56 (164). In response to the tire position trigger, imaging device 54 captures an image of the tire or a portion of the tire (166). Processor 50 analyzes the image and determines one or more tire parameter(s) (168). For example, processor 50 may calculate one or more relevant tire parameters, such as sidewall height, rim radius/diameter, tire radius/diameter, etc. Processor 50 may use these calculated tire parameters to generate configuration information for the tire dressing application device 28 (169), or, alternatively, processor 50 may refer to tire size table 72 to obtain known tire parameters with which to generate the configuration information. Processor 50 uses the configuration information to configure the application device 28 to substantially restrict application of the tire dressing to within the boundaries of the tire sidewalls (169). For example, processor 50 may retrieve the configuration information from application module 74 that have been predetermined for a wide variety of tire sizes and their corresponding tire parameters.

Once configured, application device 28 applies the tire dressing to the tire (170). For systems having an application device 28 positioned on each side of vehicle 12, the two application devices 28 may be configured to automatically apply tire dressing to both tires 16 on the same axle at approximately the same time.

In some examples, tire dressing system 24 may keep track of the first vehicle axle and the second vehicle axle. If another axle is expected (172), then the process may repeat starting with receiving the tire position trigger (164) of the tire on the rear axle. Tire dressing system 24 may, but need not necessarily, capture an image of the tire on the second (rear) axle. The system may assume that the tires on the rear axle have the same tire parameters as those on the front axle and use the image and corresponding configuration information from the front tire for both the front and rear axel of a two-axel vehicle. Alternatively, the system may capture an image of each tire as it triggers the sensor 56. After the tire dressing has been applied to all of tires 16 of vehicle 12, tire dressing system 24 resets for the next vehicle to enter car wash system 10 (174). Alternatively, tire dressing system may reset itself each time tire dressing is applied. Those of skill in the art will readily recognize that tire dressing system may capture images of the front tire only, of both the front and rear tires on one side of the vehicle, or may capture and analyze images of all four tires on a two-axel vehicle, and that the invention is not limited in this respect.

Figure 7:
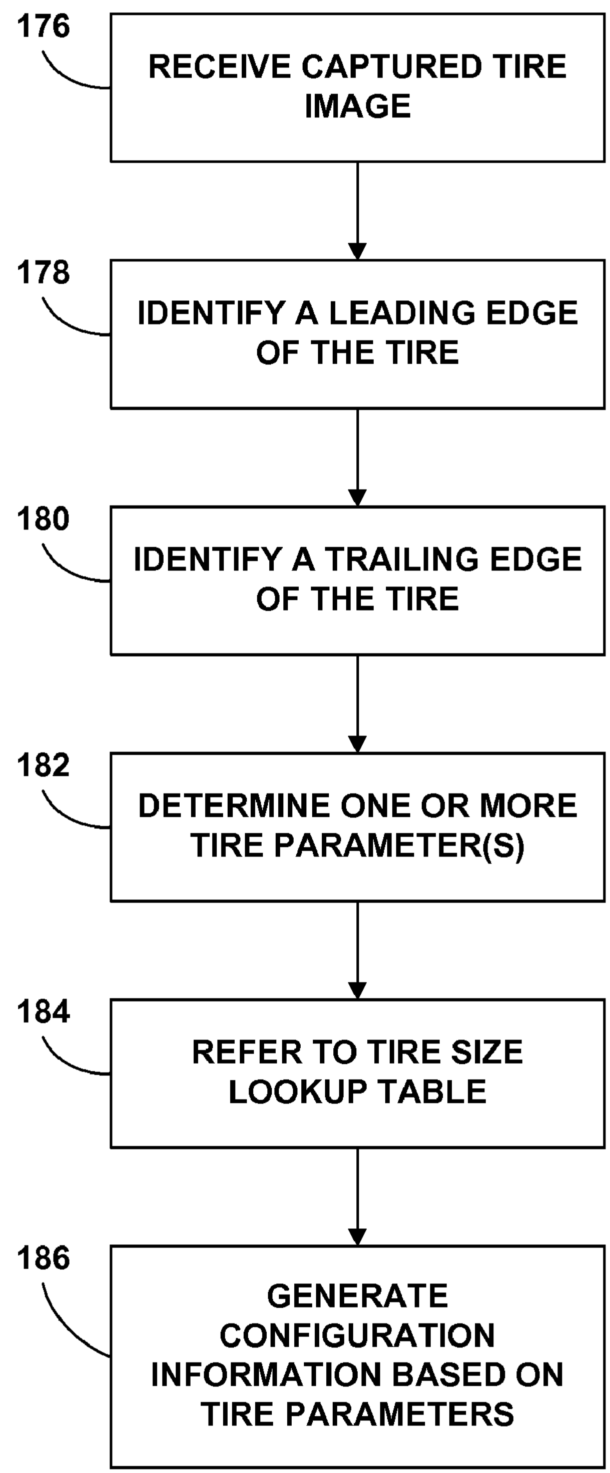
FIG. 7 is a flow diagram illustrating an example process that analyzes an image of a tire to determine one or more tire parameters.

FIG. 7 is a flow diagram illustrating an example process by which processor 50 may analyze an image of a tire to determine one or more tire parameters. Processor 50 receives the captured tire image (176). Processor 50 then analyzes the tire image to determine one or more relevant tire parameters. For example, processor 50 may analyze the image by scanning the image from one side to identify and mark the pixel(s) representative of a leading edge (background-tire boundary) of the tire (178). Processor 50 may continue to scanning across the tire image and identifying and marking the pixel(s) representative of a trailing edge (tire-rim boundary) of the tire (180). Processor 50 may determine one or more tire parameters, such as the sidewall height (from rim to tread) by determining the distance between the leading and trailing edges of the tire (182). For example, processor 50 may count the number of pixels between the leading edge and the trailing edge and multiply the number of pixels by a conversion factor to calculate the sidewall height of the tire (182). Processor 50 may also count the number of pixels between the leading vertical edge and the ground to calculate the outer sidewall radius, or may calculate other tire parameters.

From these calculations, processor 50 may use the calculated tire parameters as indices into tire size table to determine known tire parameters (184). Alternatively, processor 50 may use the calculated tire parameters to generate the configuration information necessary to deliver the tire dressing to tires 16. Finally, processor 50 generates applicator configuration information based on the one or more tire parameters (186). For example, processor 50 may retrieve the configuration information from application module 74 that have been predetermined for a wide variety of tire sizes and their corresponding tire parameters.

In some examples, the method of FIG. 7 may be adjusted or modified according to the requests of a specific user or because of an error with tire dressing system 24. Processor 50 may incorporate multiple measurement and calculation methods to average measurements or confirm previous measurements. For example, if the calculated tire parameters of a tire do not correspond with any known tire parameters stored in tire size table 72, processor 50 may re-analyze the captured tire image using a different method. In addition, processor 50 may use certain methods dependent upon the type of vehicle 12 within car wash system 10.

Figure 8:
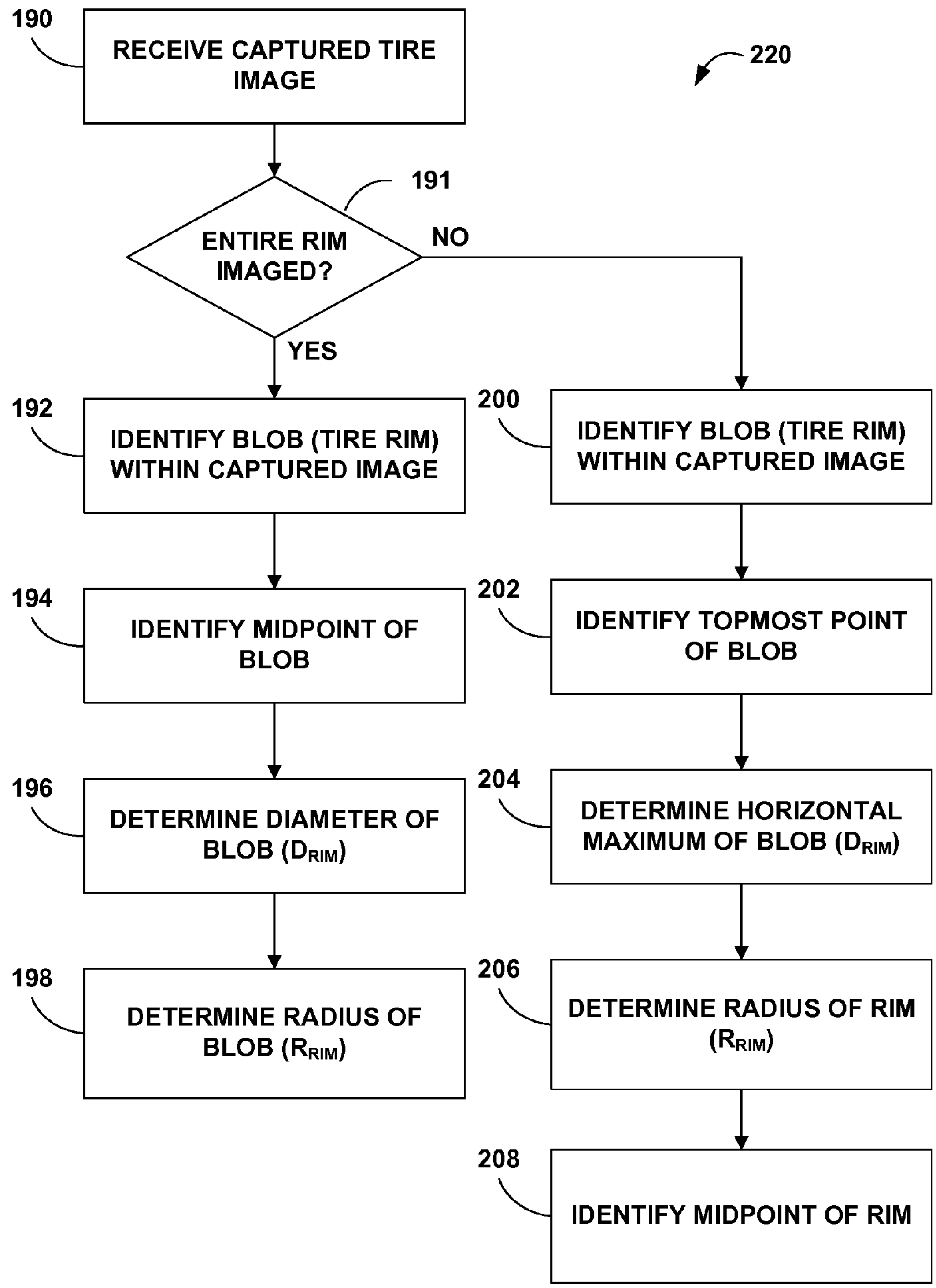
FIG. 8 is a flow diagram illustrating example processes by which image processing module may identify the midpoint of the tire rim and determine the radius of the rim, $R_{RIM}$.

FIG. 8 is a flow diagram illustrating example processes by which image processing module may identify the midpoint of the tire rim and determine the radius of the rim, $R_{RIM}$ (220). Processor 50 receives the captured tire image (190). Processor 50 may first determine whether the entire rim has been imaged (which may be determined during setup of the system depending upon the physical characteristics and presence of obstructions in the tire dressing environment) (191). Whether or not the captured image contains the entire tire rim may determine how the image is analyzed to determine the tire parameters.

If the entire rim has been imaged, for example, processor 50 may analyze the image by applying blob detection image processing techniques to identify a blob within the captured image corresponding to the rim of the tire (192). Processor 50 may identify the midpoint of the blob (194) and determine the diameter of the blob (196). For example, the diameter of the blob may be the horizontal width of the blob intersecting with the blob midpoint. Processor 50 may also determine the radius of the blob, $R_{RIM}$, by, for example, dividing the diameter of the blob, $D_{RIM}$, in half (198).

Alternatively, if the entire rim has not been imaged (e.g., if portions of the rim are obscured or if the image size only includes a portion of the rim), processor 50 may again analyze the image by applying blob detection image processing techniques to identify a blob within the captured image corresponding to the rim of the tire (200). Processor 50 may identify the topmost point of the blob (202). Processor 50 may also determine the diameter of the blob, $D_{RIM}$, based on the horizontal maximum of the blob (204). Processor 50 may also determine the radius of the blob, $R_{RIM}$, by, for example, dividing the diameter of the blob, $D_{RIM}$, in half (206). Processor 50 may identify the midpoint 87 of blob 92 by subtracting the radius ($R_{RIM}$) from the vertical position of the topmost point 97 (208).

Figure 9:
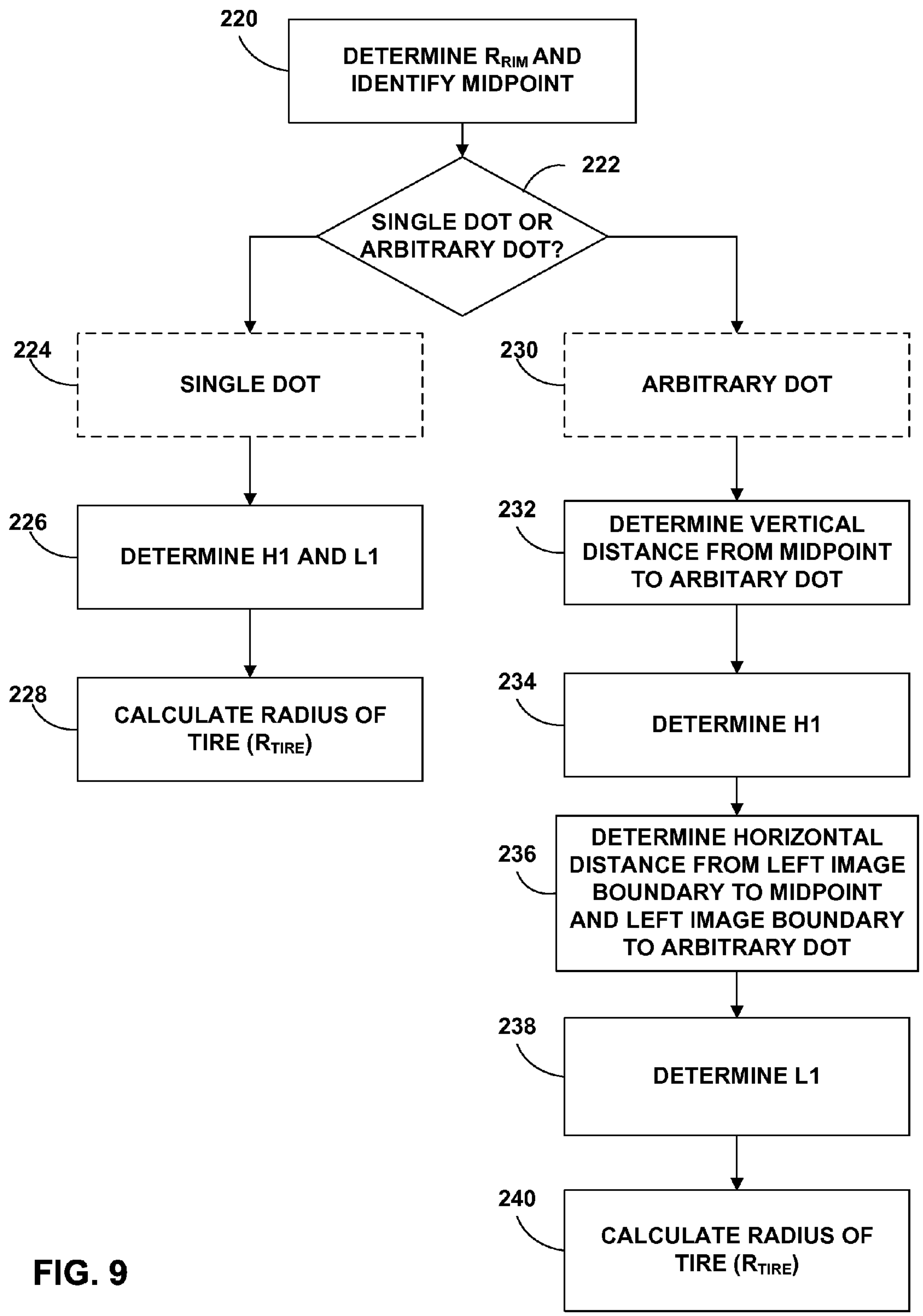
FIG. 9 is a flow diagram illustrating example processes by which image processing module may identify the radius of the tire, $R_{TIRE}$.

FIG. 9 is a flow chart illustrating example processes by which image processing module 72 may determine the radius of the tire ($R_{TIRE}$). Once processor 50 has determined the radius of the rim $R_{RIM}$ and identified the midpoint 87 of the blob/rim (220, see FIG. 8), processor 50 determines whether the system was configured using a single dot set up (such as that described above with respect to FIG. 4B) or an arbitrary dot set up (such as that described above with respect to FIG. 4C) (222). If the system was configured using the single dot set up (224), processor 50 calculates the vertical distance between the midpoint and the single dot (H1 in FIG. 4B, for example) and the horizontal distance between the midpoint and the single dot (L1 in FIG. 4B, for example) (226). From these values, processor 50 may calculate the radius of the tire, $R_{TIRE}$ (228). For example, processor 50 may calculate the radius of the tire, $R_{TIRE}$, using the Pythagorean theorem using the calculated values for H1 and L1 as discussed above.

If the system was configured using the arbitrary dot set up (230), processor 50 may determine the vertical distance between the midpoint and the arbitrary dot (G in FIG. 4C, for example) (232). Processor 50 may calculate the vertical distance between the midpoint and the sensor (H1 in FIG. 4C, for example) using the known vertical distance between the arbitrary dot and the sensor that is known from system set up (B in FIG. 4C, for example) and the determined vertical distance between the midpoint and the arbitrary dot (G in FIG. 4C, for example) (234).

Processor 50 may determine the horizontal distance between the left image boundary to the midpoint (D in FIG. 4C, for example) and the horizontal distance between the left image boundary and the arbitrary dot (E in FIG. 4C, for example) (236). Processor 50 may calculate the horizontal distance between the midpoint and the sensor (L1 in FIG. 4C, for example) using the known horizontal distance between the arbitrary dot and the sensor that is known from system set up (C in FIG. 4C, for example) and the determined values for D and E (238).

From these values for H1 and L1, processor 50 may calculate the radius of the tire, $R_{TIRE}$ (240). For example, processor 50 may calculate the radius of the tire, $R_{TIRE}$, using the Pythagorean theorem using the calculated values for H1 and L1 as discussed above.

It shall be understood that the order of the process steps described herein or shown in the flow diagrams of FIGS. 7, 8 and 9 need not be carried out in the order shown, and may be carried in any other order designed to obtain the desired tire parameters.

As described herein, the disclosure provides a tire dressing system that automatically applies a tire dressing to tires of varying sizes and side wall widths. The system determines one or more relevant tire parameters using image analysis and configures one or more application devices based on the determined tire parameters to substantially restrict application of tire dressing to within the boundaries of the tire sidewalls while minimizing the amount of tire dressing overspray reaching the body or rims of the vehicle.

Although specific examples of tire dressing system, and a car wash system, have been shown and described, it shall be understood that other embodiments could be substituted therefore without departing from the scope of the present invention. Various embodiments of the invention have been described. These and other embodiments are within the scope of the following claims.

The invention claimed is:

1. A method comprising:

capturing an image of at least one tire on a vehicle, the tire including a rim;

analyzing the image to identify a location of a rim/tire boundary;

analyzing the image to identify a location of a leading edge of the tire;

analyzing the image to identify a location of a trailing edge of the tire;

determining a radius of the tire based on a distance between the leading edge of the tire and the trailing edge of the tire;

determining a radius of the rim based on a distance between the rim/tire boundary and one of the leading edge of the tire or the trailing edge of the tire;

configuring a tire dressing application device based on the radius of the tire and the radius of the rim; and applying a tire dressing to the tire based on the configuration.

2. The method of claim 1 wherein applying a tire dressing further comprises substantially restricting application of the tire dressing to within sidewalls of the tire.

3. The method of claim 1 further comprising automatically applying a tire dressing to at least one other tire on the vehicle based on the radius of the tire and the radius of the rim.

4. The method of claim 3 further comprising automatically applying a tire dressing to all tires on the vehicle based on the radius of the tire and the radius of the rim.

5. The method of claim 1, wherein capturing an image of the tire further comprises generating a digital photograph of at least a portion of the tire.

6. The method of claim 1, wherein applying the tire dressing comprises applying the tire dressing to the tire as the tire rotates during movement of the vehicle.

7. The method of claim 1, wherein applying the tire dressing comprises spraying a tire dressing fluid onto the tire with at least one spray nozzle.

8. The method of claim 1, further comprising washing a body of the vehicle in an automated car wash system.

9. The method of claim 1, wherein determining the radius of the tire comprises referring to a tire size table that contains known tire parameters corresponding to a plurality of commercially available tires.

10. The method of claim 1, further comprising determining a tire sidewall height based on at least one of the location of the leading edge of the tire, the trailing edge of the tire, and the rim/tire boundary.

11. A method comprising:

capturing an image of at least one tire on a vehicle, the tire including a rim;

analyzing the image to identify a blob within the captured image corresponding to the rim of the tire;

analyzing the image to identify a midpoint of the blob;

determining a radius of the rim based on the midpoint of the blob;

configuring a tire dressing application device based at least on the radius of the rim; and applying a tire dressing to the tire based on the configuration.

12. The method of claim 11 wherein determining the radius of the rim further comprises determining the radius of the rim based on a horizontal width of the blob at the midpoint of the blob.

13. The method of claim 11 wherein determining the radius of the rim further comprises:

analyzing the image to identify a topmost point of the blob; and determining the radius of the rim based on a distance between the topmost point of the blob and the midpoint of the blob.

14. The method of claim 11 further comprising:

analyzing the image to identify a single dot within the captured image, the single dot having a location within the captured image corresponding to an outside edge of the tire;

determining a radius of the tire based on the distance between the midpoint of the blob and the single dot;

configuring a tire dressing application device based on the radius of the rim and the radius of the tire; and applying a tire dressing to the tire based on the configuration.

15. The method of claim 11 further comprising:

analyzing the image to identify an arbitrary dot within the captured image;

calculating a vertical distance between the midpoint of the blob and the arbitrary dot;

calculating a horizontal distance between a left boundary of the image and the midpoint of the blob;

calculating a horizontal distance between the left boundary of the image and the arbitrary dot;

determining a radius of the tire based on the vertical distance between the midpoint of the blob and the arbitrary dot, the horizontal distance between a left boundary of the image and the midpoint of the blob, and the horizontal distance between the left boundary of the image and the arbitrary dot;

configuring a tire dressing application device based on the radius of the rim and the radius of the tire; and applying a tire dressing to the tire based on the configuration.

* * * * *